United States Patent
Abhinav et al.

(10) Patent No.: US 11,562,227 B2
(45) Date of Patent: *Jan. 24, 2023

(54) INTERACTIVE ASSISTANT

(71) Applicant: Accenture Global Solutions Limited, Dublin (IE)

(72) Inventors: Kumar Abhinav, Hazaribag (IN); Alpana Dubey, Bangalore (IN); Sakshi Jain, Bangalore (IN); Michael L. Duncan, Moorpark, CA (US); Nitish Bhardwaj, Bangalore (IN); Niyati Singal, New Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 848 days.

This patent is subject to a terminal disclaimer.

(21) Appl. No.: 16/352,476

(22) Filed: Mar. 13, 2019

(65) Prior Publication Data

US 2020/0293877 A1  Sep. 17, 2020

(51) Int. Cl.
*G06N 3/08* (2006.01)
*G06T 7/00* (2017.01)
*G06F 9/451* (2018.01)

(52) U.S. Cl.
CPC ............... *G06N 3/08* (2013.01); *G06F 9/451* (2018.02); *G06T 7/0004* (2013.01)

(58) Field of Classification Search
CPC ........ G06N 3/08; G06N 3/006; G06N 3/0445; G06N 3/0454; G06F 9/451; G06F 9/453;
(Continued)

(56) References Cited

U.S. PATENT DOCUMENTS

2005/0055344 A1* 3/2005 Liu ..................... G06F 16/5838
2015/0325047 A1* 11/2015 Conner .................. G01C 21/36
345/633
(Continued)

OTHER PUBLICATIONS

Simonyan, Karen, and Andrew Zisserman. "Very deep convolutional networks for large-scale image recognition." arXiv preprint arXiv:1409.1556 (2014).
(Continued)

*Primary Examiner* — Daniel W Parcher
(74) *Attorney, Agent, or Firm* — Plumsea Law Group, LLC

(57) ABSTRACT

An interactive troubleshooting assistant and method for troubleshooting a system in real time to repair (fix) one or more problems in a system is disclosed. The interactive troubleshooting assistant and method may include receiving multimodal inputs from sensors, wearable devices, a person, etc. that may be input into a feature extractor including attention layers and pre-processing units of a cloud computing system hosted by one or more servers, such as a private cloud system. A pre-processing unit converts the raw multimodal input into a structed form so that an attention layer can give weights to features provided by the pre-processing unit according to their importance. The weighted extracted features may be provided to an actions predictor. The actions predictor generates the most suitable action based on the weighted extracted features generated by the feature extractor based on the multimodal inputs. After the most suitable action is performed, the interactive troubleshooting assistant considers new information from multimodal inputs so that the interactive troubleshooting assistant can provide the next recommended action. The interactive troubleshooting assistant may repeat these operations until the repair is completed.

17 Claims, 24 Drawing Sheets

(58) Field of Classification Search
CPC .............. G06T 7/0004; G06K 9/00671; G06K 9/6272; G06K 9/6288; G06K 9/22; G06V 10/17; G06V 10/764; G06V 10/80; G06V 10/82; G06V 20/20
See application file for complete search history.

(56) References Cited

U.S. PATENT DOCUMENTS

| | | | | |
|---|---|---|---|---|
| 2016/0085426 | A1* | 3/2016 | Scott | G06F 3/0482 715/708 |
| 2017/0329297 | A1* | 11/2017 | Gilman | B25J 9/163 |
| 2018/0136617 | A1* | 5/2018 | Xu | G06N 3/08 |
| 2018/0321951 | A1* | 11/2018 | Fitzgerald | G06K 9/00671 |
| 2019/0062996 | A1* | 2/2019 | Yoda | D21F 9/046 |
| 2019/0138333 | A1* | 5/2019 | Deutsch | G06F 30/20 |
| 2020/0160607 | A1* | 5/2020 | Kjallstrom | G06T 19/006 |
| 2020/0210850 | A1* | 7/2020 | Nuthi | G06N 3/10 |
| 2020/0293394 | A1 | 9/2020 | Abhinav et al. | |
| 2021/0151961 | A1* | 5/2021 | Weichsel | G05B 19/41805 |

OTHER PUBLICATIONS

Pennington, Jeffrey, Richard Socher, and Christopher Manning. "Glove: Global vectors for word representation." Proceedings of the 2014 conference on empirical methods in natural language processing (EMNLP). 2014.

T. Lambrou, P. Kudumakis. "Classification of Audio Signals Using Statistical Features on Time and Wavelet Transform Domains", IEEE, 2002.

A. Arnaout, B. Esmael, R.K. Fruhwirth, G. Thonhauser, "Diagnosing Drilling Problems Using Visual Analytics of Sensors Measurements", 2012 In Proc. of IEEE International Instrumentation and Measurement Technology Conference I2MTC, Graz, Austria, 2012.

* cited by examiner

INTERACTIVE ASSISTANT

CROSS-REFERENCE TO RELATED APPLICATION

This application is related to co-pending U.S. patent application Ser. No. 16/352,441, entitled "Interactive Troubleshooting Assistant", filed on Mar. 13, 2019, which is hereby incorporated by reference in its entirety.

TECHNICAL FIELD

The present disclosure relates to an interactive assistant. More specifically, the present disclosure generally relates to an interactive assistant analyzing data received from multi-modal inputs of smart and connected components and/or a digital twin and a method for analyzing the data. Even more specifically, the present disclosure generally relates to an interactive assistant for providing recommendations for further investigation and/or repair to a user after receiving at least one of user input and data from smart and connected components and/or a digital twin to provide a next recommendation.

BACKGROUND

During manufacturing or operations, components, equipment, and processes of a system can fail partially or completely due to any number of reasons and these components, equipment, and processes must be repaired to continue system operations. Troubleshooting is needed to examine the state of a system and identify symptoms of one or problems (issues) with the system so that an initial diagnosis or cause of the one or more failures in a system can be determined. A field engineer or technician may be dispatched to troubleshoot the problem on the site of the system and may attempt to follow a standard procedure to fix the problem, which may provide an initial recommended solution. The initial standard procedure may include a sequence of instructions to take certain actions. However, the field engineer or technician may or may not have the correct parts and tools to follow the standard procedure and to take these actions. In addition, the initial diagnosis made by the field engineer or technician to fix the problem may or may not be accurate. Further, as the field engineer or technician is in the process of repairing or fixing the one or more problems based on the initial recommended solution, the state of the system may change during the standard procedure and therefore new information is generated. However, existing troubleshooting systems do not consider new information, which is generated during the real time repair of components, equipment, or processes of a system and which is generated during inspection of the system by a field engineer or technician. Thus, the existing troubleshooting systems provide a static diagnosis and static solution, which may include a static set of instructions or actions to be taken by a field engineer or technician. Accordingly, there is no method or apparatus to dynamically update the initial diagnosis and dynamically change the initial set of instructions or actions to be performed by the field engineer or technician.

In addition, during installation of a new system, an installer such as a filed engineering or technician may follow a static set of installation instructions for installation of a new system. Accordingly, there is no method or apparatus to dynamically update the installation instructions and dynamically change the initial set of instructions or actions to be performed by the field engineer or technician during installation.

There is a need in the art for a system and method that addresses the shortcomings of the prior art discussed above.

SUMMARY

An interactive troubleshooting assistant and method for troubleshooting a system is disclosed. The method includes troubleshooting a system in real time to repair (fix) one or more problems (issues) by analyzing data generated by smart and connected components and/or provided by a user, such as a technician or field engineer. The interactive troubleshooting assistant and method solves at least the problems discussed above by receiving information regarding the system and providing an initial diagnosis of one or more problems in order to assign a correct one or more workers with the correct tools and parts (as needed) to repair the system, and by receiving and considering new information by monitoring the system during a repair process and adapting to new information after each action in the repair process is performed to provide the next recommended action in the process for repairing the system. The interactive troubleshooting assistant provides real time recommendations for each action in the repair process by considering new information after each action is performed so that the interactive troubleshooting assistant can provide the next recommended action. By modeling troubleshooting as a sequence to sequence prediction problem and processing multimodal inputs, such as text, image, and sensor data from multiple sources, the interactive troubleshooting assistant and method considers new information after each action is performed and recommends the next action until the system is repaired, so that the amount of time required to diagnose the one or more problems and the amount of time required for repair of the system decreases. Accordingly, one or more embodiments utilize artificial intelligence to provide a dynamically changing set of instructions so that actions can be dynamically changed after completion of each action to decrease the time to correct one or more system failures.

In an aspect, the disclosure provides a method of troubleshooting a system for detecting a system failure and for dynamically recommending one or more actions for repairing the detected failure of the system. The method may include receiving initial sensor inputs from internet of things (IOT) sensors and storing the initial sensor inputs as initial sensor data in a cloud server. The method may include analyzing the initial sensor data to detect the system failure. The method may include designating a worker to repair the detected system failure based on the analysis of the initial sensor data. The method may include repairing the detected system failure by repeatedly performing operations until the failure is repaired. The operations may include receiving images from an imaging device and text from a mobile computing device and storing the images as image data and the text as text data in the cloud server. The operations may include receiving additional sensor inputs from internet of things (IOT) sensors and storing the additional sensor inputs as sensor data in the cloud server. The operations may include extracting features from image data, text data, and sensor data, weighting the extracted features, and storing the weighted extracted features in the cloud server. The operations may include recommending an action based on the weighted extracted features and communicating the action to a mobile computing device of the designated worker from the cloud server. The operations may include performing the action by the designated worker unless the recommended action from the cloud server indicates that the system is repaired. The method may also include communicating, from the mobile computing device of the designated worker to the cloud server, a message which confirms that the system is repaired.

In yet another aspect, the disclosure provides a non-transitory computer readable medium storing software, which may include instructions executable by one or more computers, which, upon such execution, cause the one or more computers to: (1) receive initial sensor inputs from internet of things (IOT) sensors and store the initial sensor inputs as initial sensor data in a cloud server; (2) analyze the initial sensor data to detect the system failure; (3) designate a worker to repair the detected system failure based on the analysis of the initial sensor data; (4) repair the detected system failure by repeatedly performing operations until the failure is repaired; and (5) communicate, from the mobile computing device of the designated worker to the cloud server, a message which confirms that the system is repaired. The operations may include (1) receiving images from an imaging device and text from a mobile computing device and storing the images as image data and the text as text data in the cloud server; (2) receiving additional sensor inputs from internet of things (IOT) sensors and storing the additional sensor inputs as sensor data in the cloud server; (3) extracting features from image data, text data, and sensor data, weighting the extracted features, and storing the weighted extracted features in the cloud server; (4) recommending an action based on the weighted extracted features and communicating the action to a mobile computing device of the designated worker from the cloud server; and (5) performing the action by the designated worker unless the recommended action from the cloud server indicates that the system is repaired.

In yet another aspect, the disclosure provides an interactive troubleshooting assistant for troubleshooting a system to detect a system failure and for dynamically recommending one or more actions for repairing the detected failure of the system, the interactive troubleshooting assistant may include one or more computers and one or more storage devices storing instructions that are operable, when executed by one or more computers, to cause one or more computers to: (1) receive initial sensor inputs from internet of things (IOT) sensors and store the initial sensor inputs as initial sensor data in a cloud server; (2) analyze the initial sensor data to detect the system failure; (3) designate a worker to repair the detected system failure based on the analysis of the initial sensor data; (4) repair the detected system failure by repeatedly performing operations until the failure is repaired; and (5) communicate, from the mobile computing device of the designated worker to the cloud server, a message which confirms that the system is repaired. The operations may include (1) receiving images from an imaging device and text from a mobile computing device and storing the images as image data and the text as text data in the cloud server; (2) receiving additional sensor inputs from internet of things (IOT) sensors and storing the additional sensor inputs as sensor data in the cloud server; (3) extracting features from image data, text data, and sensor data, weighting the extracted features, and storing the weighted extracted features in the cloud server; (4) recommending an action based on the weighted extracted features and communicating the action to a mobile computing device of the designated worker from the cloud server; and (5) performing the action by the designated worker unless the recommended action from the cloud server indicates that the system is repaired.

In yet another aspect, the disclosure provides a method of installing a system by dynamically recommending actions for system installation. The method may include accessing digital twin information from a digital twin stored on a cloud server through an interactive assistant stored on the cloud server for system installation; assigning a designated worker by the interactive assistant for system installation; displaying an installation map on a display of the mobile communication device based on digital twin information provided to the mobile communication device through the interactive assistant; performing system installation by repeatedly performing operations until the system is installed. The operations may include recommending action to be performed by the designated worker based on analysis of digital twin information and based on images from an imaging device by using the interactive assistant; performing the recommended action by the designated worker; determining whether recommended action is performed correctly by analyzing the digital twin information and images from the imaging device using the interactive assistant; responding to an incorrect performance of the recommended action by recommending the action to be performed and performing the recommended action until the performance of the recommended action is correct using the interactive assistant; updating digital twin information when the recommended action is performed correctly; and displaying updated map on the display of the mobile computing device based on the updated twin information. After the installing is completed, the method may further include displaying that the installation is completed on the display of the mobile computing device may display that the installation is complete after the system is installed based on analysis of the interactive assistant.

In yet another aspect, the disclosure provides a non-transitory computer readable medium storing software, which may include instructions executable by one or more computers, which, upon such execution, cause the one or more computers to: (1) access digital twin information from a digital twin stored on a cloud server through an interactive assistant stored on the cloud server for system installation; (2) assign a designated worker by the interactive assistant for system installation; (3) display an installation map on a display of a mobile communication device based on digital twin information provided to the mobile communication device through the interactive assistant; and (4) perform system installation by repeatedly performing operations until the system is installed. The operations may include (1) recommending action to be performed by the designated worker based on analysis of digital twin information and based on images from an imaging device by using the interactive assistant; (2) performing the recommended action by the designated worker; (3) determining whether recommended action is performed correctly by analyzing the digital twin information and images from the imaging device using the interactive assistant; (4) responding to an incorrect performance of the recommended action by recommending the action to be performed and performing the recommended action until the performance of the recommended action is correct using the interactive assistant; (5) updating digital twin information when the recommended action is performed correctly; and (6) displaying updated map on the display of the mobile computing device based on the updated twin information. The method may further include displaying installation is completed on the display of the mobile computing device after the system is installed based on analysis of the interactive assistant. The operations may include In yet another aspect, the disclosure provides an interactive assistant for installing a system and for dynamically recommending one or more actions for installing the system, the interactive assistant may include one or more computers and one or more storage devices storing instructions that are operable, when executed by one or more computers, to cause one or more computers to: (1) access digital twin information from a digital twin stored on a cloud server through an interactive assistant stored on the cloud server for system installation; (2) assign a designated worker by the interactive assistant for system installation; (3) display an installation map on a display of a mobile communication device based on digital twin information provided to the mobile communication device through the interactive assistant; (4) perform system installation by repeatedly performing operations until the system is installed. The operations may include (1) recommending action to be performed by the designated worker based on analysis of digital twin information and based on images from an imaging device by using the interactive assistant; (2) performing the recommended action by the designated worker; (3) determining whether recommended action is performed correctly by analyzing the digital twin information and images from the imaging device using the interactive assistant; (4) responding to an incorrect performance of the recommended action by recommending the action to be performed and performing the recommended action until the performance of the recommended action is correct using the interactive assistant; (5) updating digital twin information when the recommended action is performed correctly; and (6) displaying updated map on the display of the mobile computing device based on the updated twin information. The method may further include displaying installation is completed on the display of the mobile computing device after the system is installed based on analysis of the interactive assistant.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

An interactive troubleshooting assistant and method for troubleshooting a system is disclosed. The method includes troubleshooting a system in real time to repair (fix) one or more problems (issues) by analyzing data generated by smart and connected components and/or provided by a user, such as a technician or field engineer. Initially, an interactive trouble shooting assistant analyzes data generated from smart and connected components to provide a repair process and assign the correct designated worker or designated workers with the correct tools and parts to repair (fix) the system or a part of the system. The designated worker or designated workers are hereinafter referred to as a designated worker. The designated worker may be the user of the interactive troubleshooting assistant. The designated worker may have one or more mobile (portable) computing devices, such as a smartphone, tablet, smartwatch, smart glass, or smart helmet. Although these mobile computing devices may be handheld or wearable, other mobile computing devices, such as a laptop may be used. An application may be installed on the one or more mobile computing devices to communicate with the interactive troubleshooting assistant to supply information to the interactive troubleshooting assistant or to receive recommended actions from the interactive troubleshooting assistant.

The interactive troubleshooting assistant enables the user to comprehensively monitor the condition of one or more components of the system or the system itself by monitoring various operating parameters, environmental data, and other external data sources before and after the partial failure or failure of one or more components in the system. Based on the evaluation of this data, the interactive troubleshooting assistant provides a detailed diagnosis of the problem (issue) and a recommended repair process along with a list of required tools and parts. The interactive troubleshooting assistant may receive new information from at least one of machine vision (image data), Internet of Things (IOT) sensor data and designated worker input (multimodal inputs) after each action in the repair process is performed by the designated worker. The IOT sensor data may be generated by IOT sensors of smart and connected components of a system which includes one or more machines. The interactive troubleshooting assistant adapts to the new information after each action in the repair process is performed to provide the next recommended action in the repair process. The interactive troubleshooting assistant provides real time recommendations for each action in the repair process by considering new information after each action is performed so that the interactive troubleshooting assistant can provide the next recommended action. Once all the actions are performed, the system is repaired.

Figure 1:
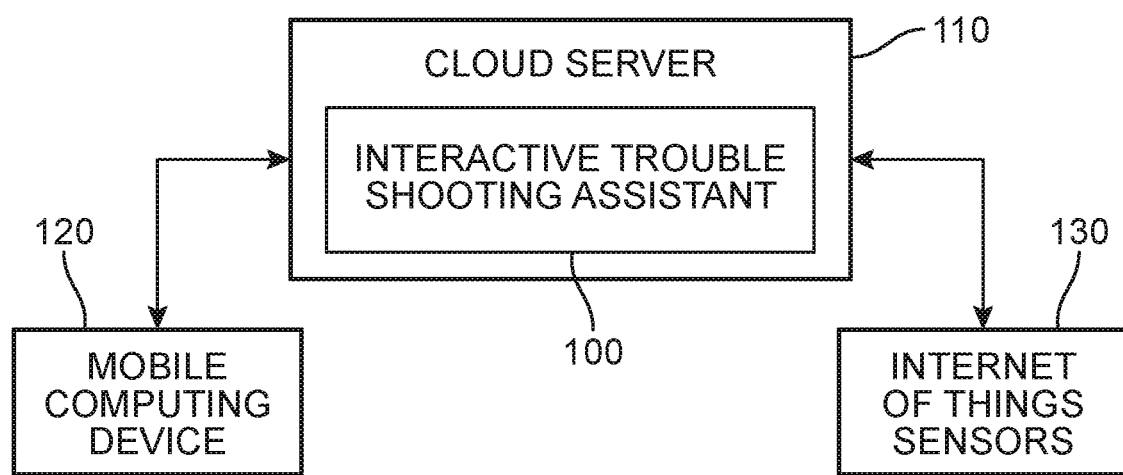
FIG. 1 is a block diagram of an embodiment of an interactive troubleshooting assistant.

For example, FIG. 1 is a block diagram of an embodiment of interactive trouble shooting assistant 100 hosted by a cloud server 110 and coupled to a mobile computing device (portable electronic device) 120 and internet of things (IOT) sensors 130 through the cloud server 110. Although the interactive trouble shooting assistant 100 hosted by a cloud server 110 is shown coupled to one mobile computing device 120 in FIG. 1, other embodiments may include one or more mobile computing devices 120. The cloud server 110 may also be coupled wirelessly to one or more mobile computing devices 120 and may be coupled wirelessly or directly to IOT sensors 130. The IOT sensors 130 provide IOTs sensor data (IOT sensor information) to the interactive trouble shooting assistant 100 hosted on the cloud server 110, so that the interactive trouble shooting assistant 100 can monitor the state (condition) of a system to identify or anticipate problems or issues which may cause or have caused one or more failures in the monitored system. Although a cloud server 110 is shown as an embodiment in FIG. 1 and other figures, any hosted server or a plurality of hosted servers may be used. One or more cloud servers may be used. Any of these one or more cloud servers may be public or private.

Figure 2:
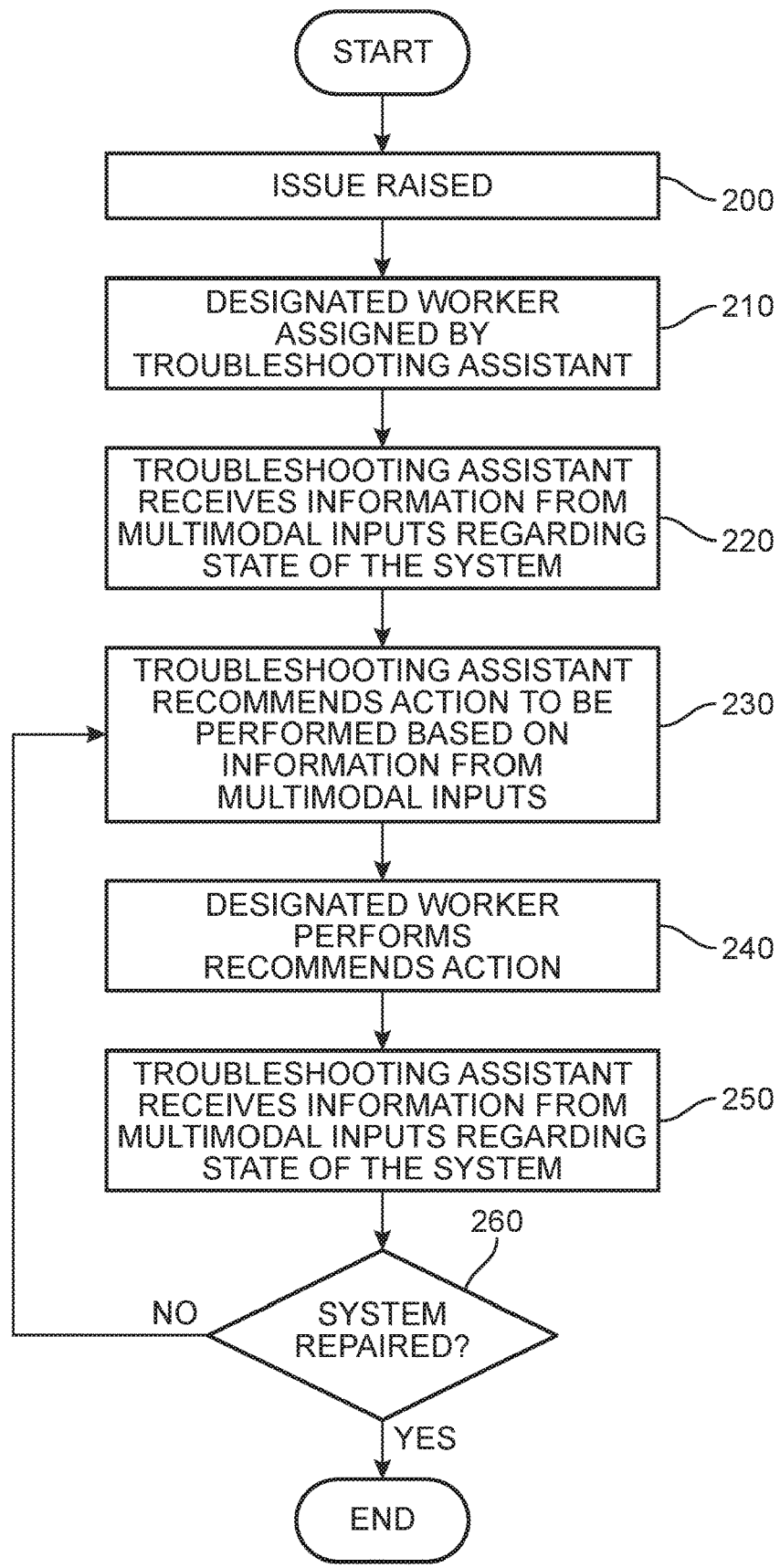
FIG. 2 shows an embodiment of a method of troubleshooting a system for dynamically recommending one or more actions for repairing the system.

FIG. 2 shows an embodiment of a method of troubleshooting a system for dynamically recommending one or more actions for repairing the system. As discussed above, an interactive troubleshooting assistant 100 monitors the state of a system and detects any issues (problems) that are raised (operation 200). One or more issues (problems) are raised (detected) by an analysis of the IOT sensor data received by the interactive trouble shooting assistant 100 (operation 200).

After at least one issue (problem) has been raised, the interactive troubleshooting assistant 100 assigns a designated worker to inspect (investigate) the one or more issues (problems) (operation 210) raised as a result of the monitoring by the interactive troubleshooting assistant 100 in operation 200. This assignment is based on one or more issues being raised. In addition, as part of the designated worker assignment, the interactive trouble shooting assistant 100 may also recommend that one or more tools and/or one or more parts be taken by the designated worker to the area (location) of the raised issue (operation 210). The interactive troubleshooting assistant 100 may receive multimodal inputs regarding the state of the system (operation 220). These multimodal inputs may include the initial IOT sensor data, one or more images (image data), and text (text data). The image data may be collected and provided to the interactive troubleshooting assistant 100 by an image capture device (e.g., a camera), which is part of the system, or by one or more image capture devices of one or more mobile computing devices 120. The captured image data may include one or more images of a component of the system and/or an area around the component of the system that the designated worker has been sent to investigate. The designated worker may possess one or more mobile computing devices 120. Examples of the one or more mobile computing devices 120 include a smartphone, a tablet, a smartwatch, a smart glass, a smart helmet, and a laptop, which can communicate wirelessly with the interactive troubleshooting assistant 100 hosted by the cloud server 110. The designated worker may use the one or more mobile computing devices 120 to input text which is wirelessly communicated to the interactive troubleshooting assistant 100 hosted by the cloud server 110 (operation 220). An application may be installed on the one or more mobile computing devices 120 to communicate with the interactive troubleshooting assistant 100 to supply information to the interactive troubleshooting assistant 100 or to receive recommended actions from the interactive troubleshooting assistant 100.

Based on an analysis of the multimodal inputs, the interactive troubleshooting assistant 100 recommends that the designated worker perform an action (operation 230). Examples of a designated worker include a technician, a field engineer, and a robot. The robot may be an autonomous robot. The designated worker may be a user. In the disclosure, the designated worker may refer to one or more designated workers. In addition, if the designated worker is a robot, the mobile computing device 30 may be embedded in the robot (may be a part of the robot), may be held by the robot, or may be worn by the robot. These configurations are intended to be examples.

After the designated worker receives the recommended action through the mobile computer device 120 from the interactive trouble shooting assistant 100 (operation 230), the designated worker performs the recommended action (operation 240). Thereafter, the interactive troubleshooting assistant 100 receives additional data (additional information) from one or more multimodal inputs regarding the state of the system after the recommended action is performed (operation 250). The interactive troubleshooting assistant 100 determines whether the system is repaired based on multimodal inputs received by the interaction troubleshooting assistant 100 in operation 250 after the recommended action is performed (operation 260). These multimodal inputs may include one or more of IOT sensor data, images (image data), or text (text data). When the interactive troubleshooting assistant 100 determines that the system is repaired (one or more issues or problems resolved) (operation 260), the interactive troubleshooting assistant 100 recognizes the problem or issue has been repaired and continues to monitor the system to detect any new issues or problems. When the interactive troubleshooting assistant 100 determines that the system is not repaired (operation 260), then the interactive troubleshooting assistant 100 returns to operation 230 so that another action can be recommended to the designated worker (operation 230) followed by operations 240, 250, and 260 until the interactive troubleshooting assistant 100 determines that the system is repaired. The interactive troubleshooting assistant 100 considers new information (new data) after each action is performed and recommends the next action until the system is repaired, so that the amount of time required to diagnose the one or more problems and the amount of time required for repair of the system decreases.

Figure 3:
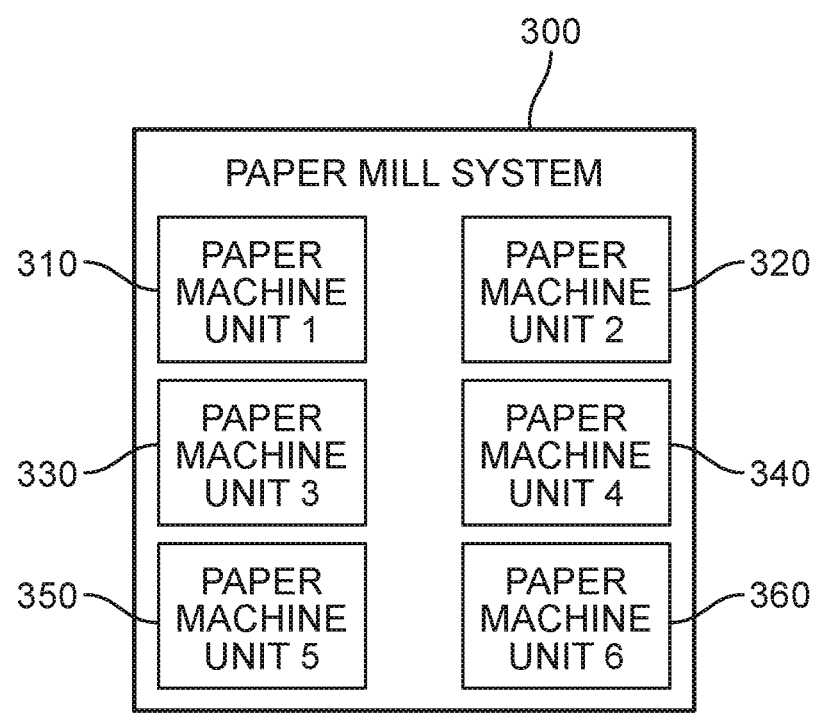
FIG. 3 is a block diagram of an example of a paper mill system including paper machines for troubleshooting.

FIG. 3 is a block diagram of an example of a paper mill system 300 including paper machine units (paper machines) 310-360, which can be monitored by the interactive troubleshooting assistant 100 to detect any issues (problems) caused by one or more failures in the paper mill system. Each paper machine 310-360 has components.

Figure 4A:
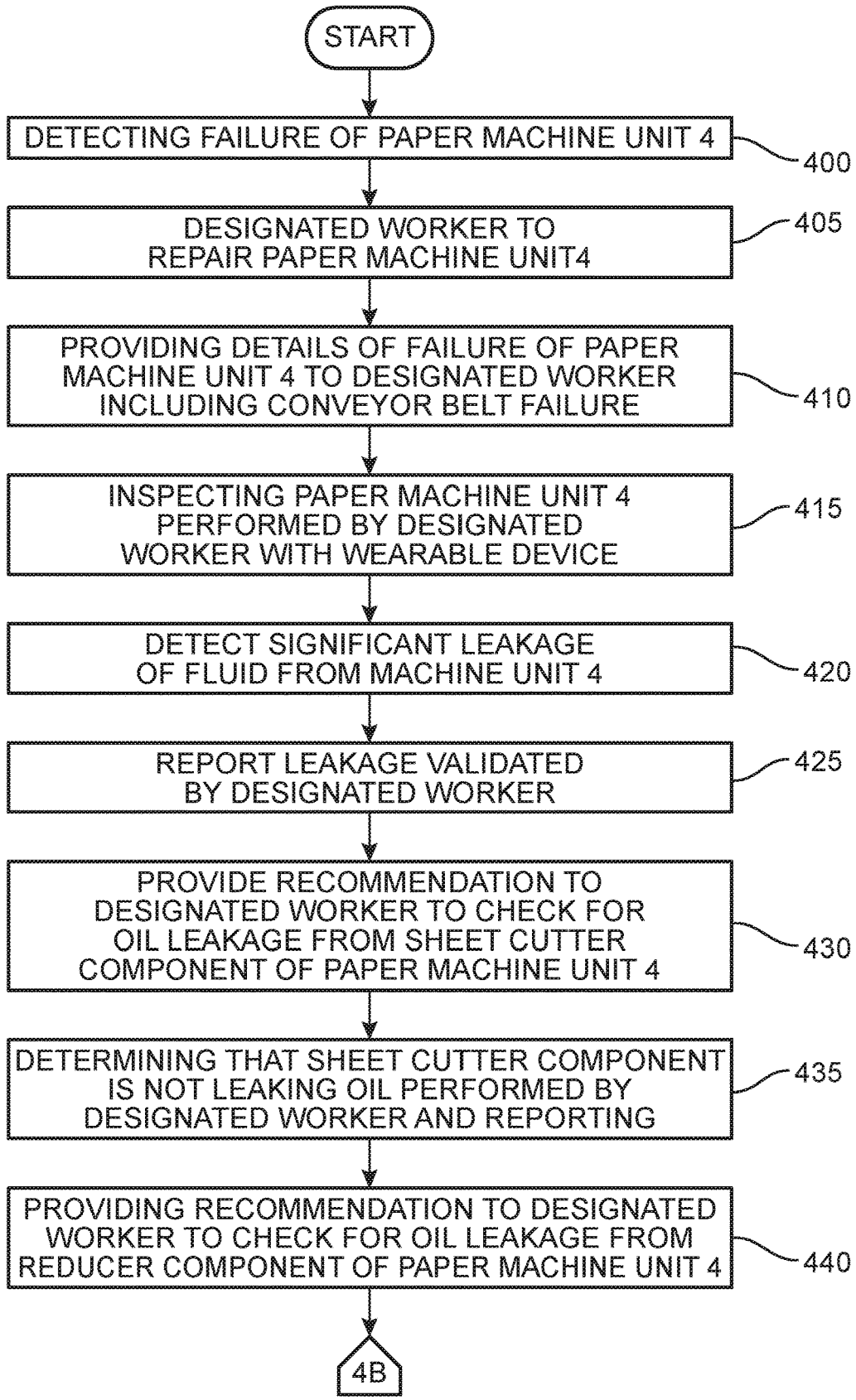
FIGS. 4A and 4B show an example of an embodiment of a method of troubleshooting the paper mill machines in the paper mill system in FIG. 3.
Figure 4B:
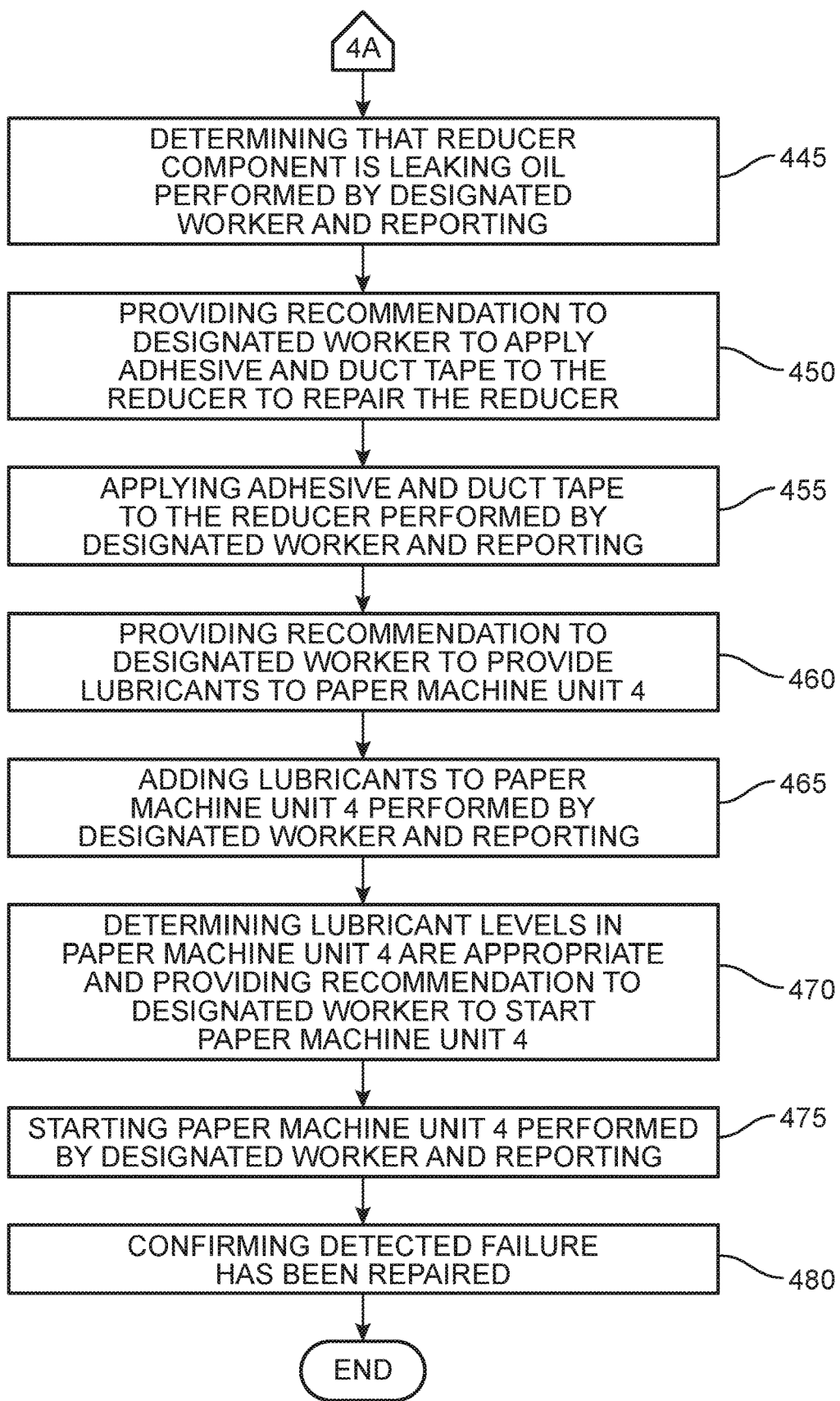

FIGS. 4A and 4B show an example of an embodiment of a method of troubleshooting the paper mill machines in the paper mill system in FIG. 3 by using the interactive troubleshooting assistant 100 in FIG. 1 and the interactive trouble shooting method shown in FIG. 2

In the example shown in FIGS. 4A and 4B, a failure is detected in paper machine unit 4 designated by reference numeral 340 of the paper mill system 300 by the interactive troubleshooting assistant 100 shown in FIG. 1 (operation 400). Operation 400 in FIG. 4A generally corresponds to operation 200 (issue raised) in FIG. 2. The IOT sensors 130 of FIG. 1 provide IOTs sensor data (IOT sensor information) to the interactive trouble shooting assistant 100 hosted on the cloud server 110, so that the interactive trouble shooting assistant 100 can monitor the state (condition) of a system to identify or anticipate problems or issues which may cause or have caused one or more failures in the monitored system. One or more issues (problems) are raised (detected) by an analysis of the IOT sensor data received by the interactive trouble shooting assistant 100 (operation 400). After the interactive troubleshooting assistant 100 detects the failure in paper machine unit 4, this exemplary method designates a worker (designated worker) to repair paper machine unit 4 (operation 405). Operation 405 in FIG. 4 generally corresponds to operation 210 in FIG. 2. The designated worker may be chosen based on one or more issues being raised. The interactive troubleshooting assistant 100 may also recommend that one or more tools and/or one or more parts be taken by the designated worker to the area (location) of the raised issue (operation 410). In addition, the interactive troubleshooting assistant 100 may provide information to the designated worker by communicating with one or more mobile computing devices 120 provided to the designated worker. An example of this information is the conveyor belt in paper machine unit 4 has failed (operation 410). Operations 405 and 410 in FIG. 4 may be generally performed by operations 210 through 230 in FIG. 2. However, operation 230 in FIG. 2 can apply to other operations in FIG. 4.

In this example, after receiving information from the interactive trouble shooting assistant 100 through one or more mobile computing devices 120, the designated worker visually inspects paper machine unit 4 and collects image data through an image capture device of a wearable device (operation 415). A wearable device is an example of a mobile computing device 120. The image capture device provides one or more images of a significant leakage of fluid from machine unit 4 (operation 420). In this example, the image data is wirelessly communicated to the interactive trouble shooting assistant 100 in operation 420, and the image data is validated by a text transmitted to the interactive trouble shooting assistant 100 by way of a mobile computing device 120 (operation 425). The trouble shooting assistant 100 provides a recommendation to the designated worker based on the image data, the text data, and IOT sensor data provided by IOT sensors 130. In operation 430, the interactive troubleshooting assistant 100 recommends that the designated worker check for oil leakage from a sheet cutter component of paper machine unit 4 (operation 430). Operations 410-430 of FIG. 4 may be generally performed by operations 220 and 230 in FIG. 2.

The designated worker performs the recommended action of checking the sheet cutter or machine unit 4 for leakage and determines that the sheet cutter has not leaked. The designated worker also reports this determination to the interactive troubleshooting assistant 100 (operation 435). Operations 430 and 435 may be generally performed by applying operations 240 through 260 of FIG. 2. As indicated in operation 440, another recommendation is made to the designated worker, which is similar to the operation 230 in FIG. 2. More specifically, in operation 440, the interactive troubleshooting assistant 100 provides the designated worker with the recommendation to check a reducer of the paper machine unit 4 for leakage. The designated worker performs the action of inspecting the reducer and determines that the reducer component of paper machine unit 4 is leaking and the designated worker reports this determination to the interactive troubleshooting assistant 100 (operation 445).

After the interactive troubleshooting assistant 100 determines that the reducer of the paper machine unit 4 is leaking fluid, the troubleshooting assistant 100 provides the designated worker with a recommendation to apply adhesive and duct tape to the reducer to repair the reducer (operation 450), and the designated worker applies adhesive and duct tape to the reducer (operation 455). The interactive troubleshooting assistant 100 also recommended that the designated worker provide additional lubricants (fluids) to paper machine unit 4 (operation 460), and the designated worker performed the action of applying lubricants to paper machine unit 4 (operation 465). Thereafter, the IOT sensors provide IOT sensor data to the interactive troubleshooting assistant 100 including sensor data indicating the lubricant levels in paper machine unit 4 are satisfactory. Therefore, the interactive troubleshooting assistant 100 recommends a next action to the designated worker, which is to start paper machine unit 4 (operation 470). The designated worker starts paper machine unit 4 and reports the starting of the paper machine unit 4 to the interactive troubleshooting assistant 100 (operation 475). The designated worker may report to the interactive troubleshooting assistant 100 by the mobile computing device 120. The designated worker may confirm that the detected failure has been repaired and report this confirmation to the interactive troubleshooting assistant 100 (operation 480). Alternatively, the designated worker and interactive troubleshooting assistant 100 may both confirm that the detected failure has been repaired (operation 480). Operation 480 is performed by applying operation 260 in FIG. 2.

Figure 5:
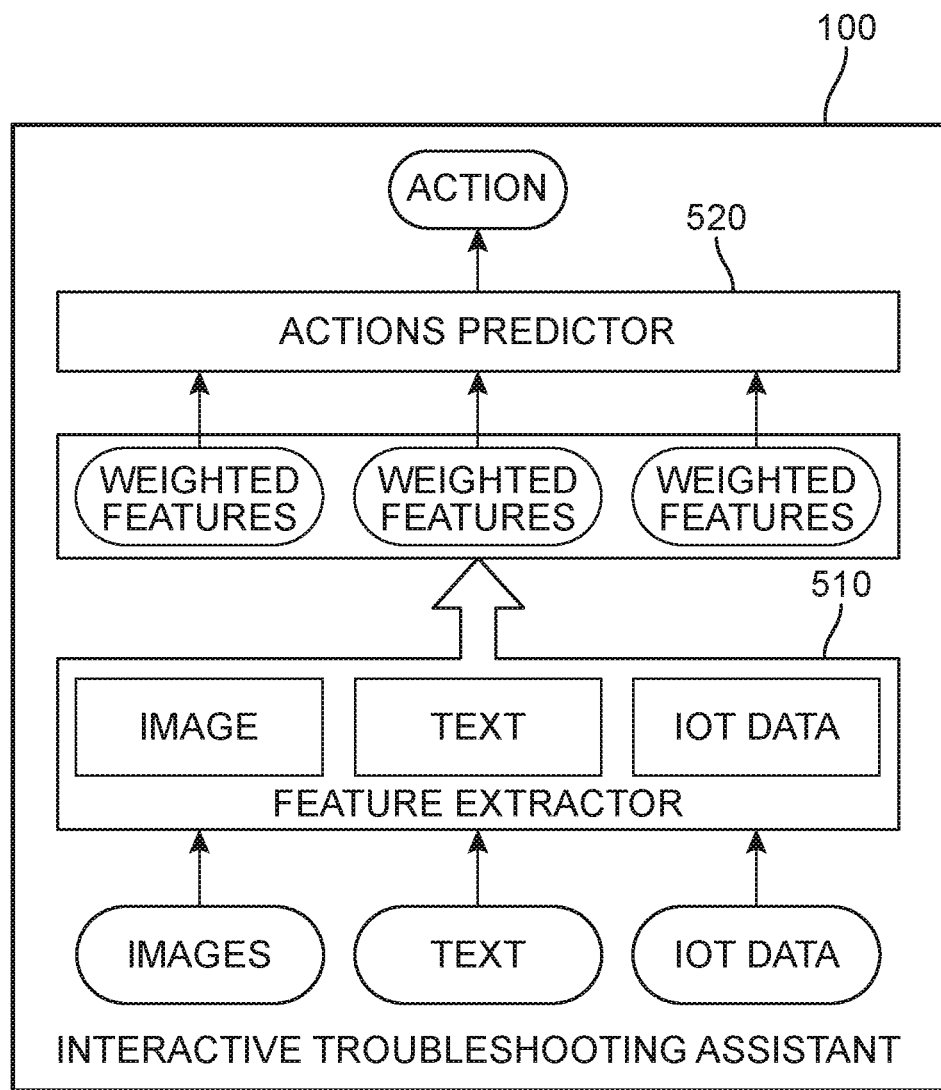
FIG. 5 is a diagram of an embodiment of an interactive troubleshooting assistant.

FIG. 5 is a diagram of an embodiment of a troubleshooting assistant 100. In an embodiment, a cloud server 110 hosts or includes the interactive troubleshooting assistant 100 which is shown in FIG. 1 and FIG. 5. The troubleshooting assistant 100 in FIG. 5 may include the feature extractor 510 of FIG. 5, which converts multimodal inputs into a structured form which is suitable for an action predictor 520, which recommends a course of action to be performed. The interactive troubleshooting assistant 100 may include the action predictor 520. Although a private cloud server is one embodiment, any privately hosted server or a plurality of privately hosted servers may be used. One or more private cloud servers may be used. In addition, one or more public cloud servers may be used.

Figure 6:
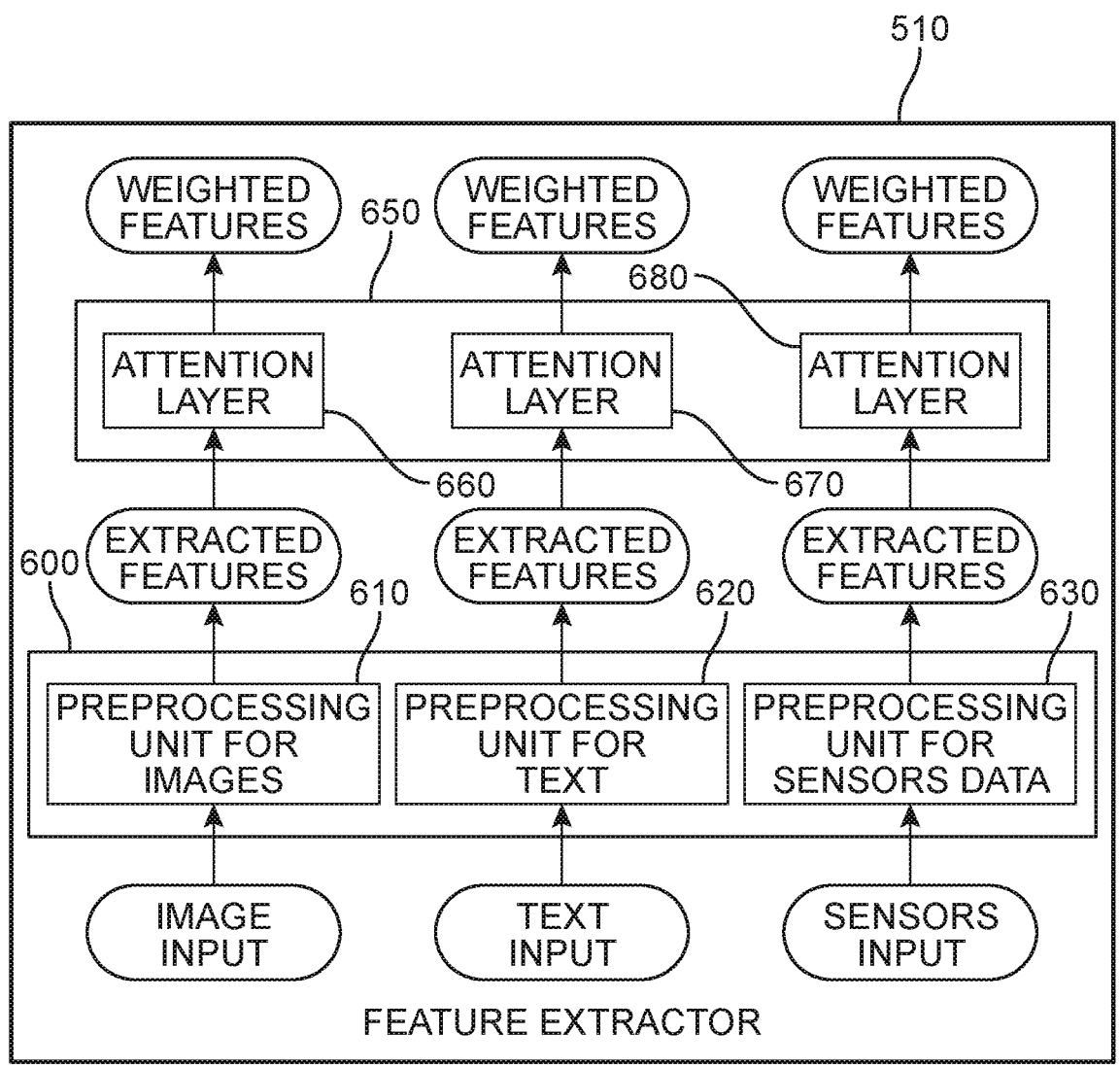
FIG. 6 is a diagram of an embodiment of a feature extractor of the trouble shooting assistant in FIG. 5.

The feature extractor 510 includes a plurality of preprocessing units (preprocessors) 600, such as a preprocessing unit for images (preprocessor for images or image preprocessor) 610, a preprocessing unit for text (preprocessor for text or text preprocessor) 620, and a preprocessing unit for IOT sensor data (preprocessor for IOT sensor data or IOT preprocessor) 630, which receive multimodal inputs which are data or information from various devices. FIG. 6 is a diagram of an embodiment of a feature extractor of the trouble shooting assistant 100 in FIG. 5.

The image preprocessor 610 may receive image input from any type of camera or any other image capture device. An image capture device, such as a camera may be installed as part of the monitored system or may be part of a wearable device 120 worn by a designated worker, such as a field engineer or technician. The designated worker may also be a robot. The text preprocessor 620 may receive text by way of a mobile computing device 120. For example, the designated worker may input the text into the mobile computing device 120 which transmits the inputted text to the interactive troubleshooting assistant 100, so that the text preprocessor receives the text inputted by the designated worker. In some embodiments, the text preprocessor 620 may receive a text that was converted from a user utterance (e.g., voice command) by a speech-to-text system. The IOT preprocessor 630 receives sensor data from IOT sensors 130 which monitor the system. There may be one or more preprocessing units 600 for IOT sensor data depending upon the type of IOT sensor data. Multimodal inputs received by the respective preprocessing units are converted into a structured form and provide extracted relevant features from the multimodal inputs in the structured form to respective attention layers 650. For example, images input to an image preprocessor 610 are converted into a suitable structured form, and extracted features in this suitable structured form are provided to an attention layer 660 for the extracted converted image input. The attention layer 660 for images may provide weights to the extracted features according to their importance. The action predictor 520, which includes deep neural network layers, may receive the weighted features to generate a recommended action to be taken by the designated worker.

Figure 7:
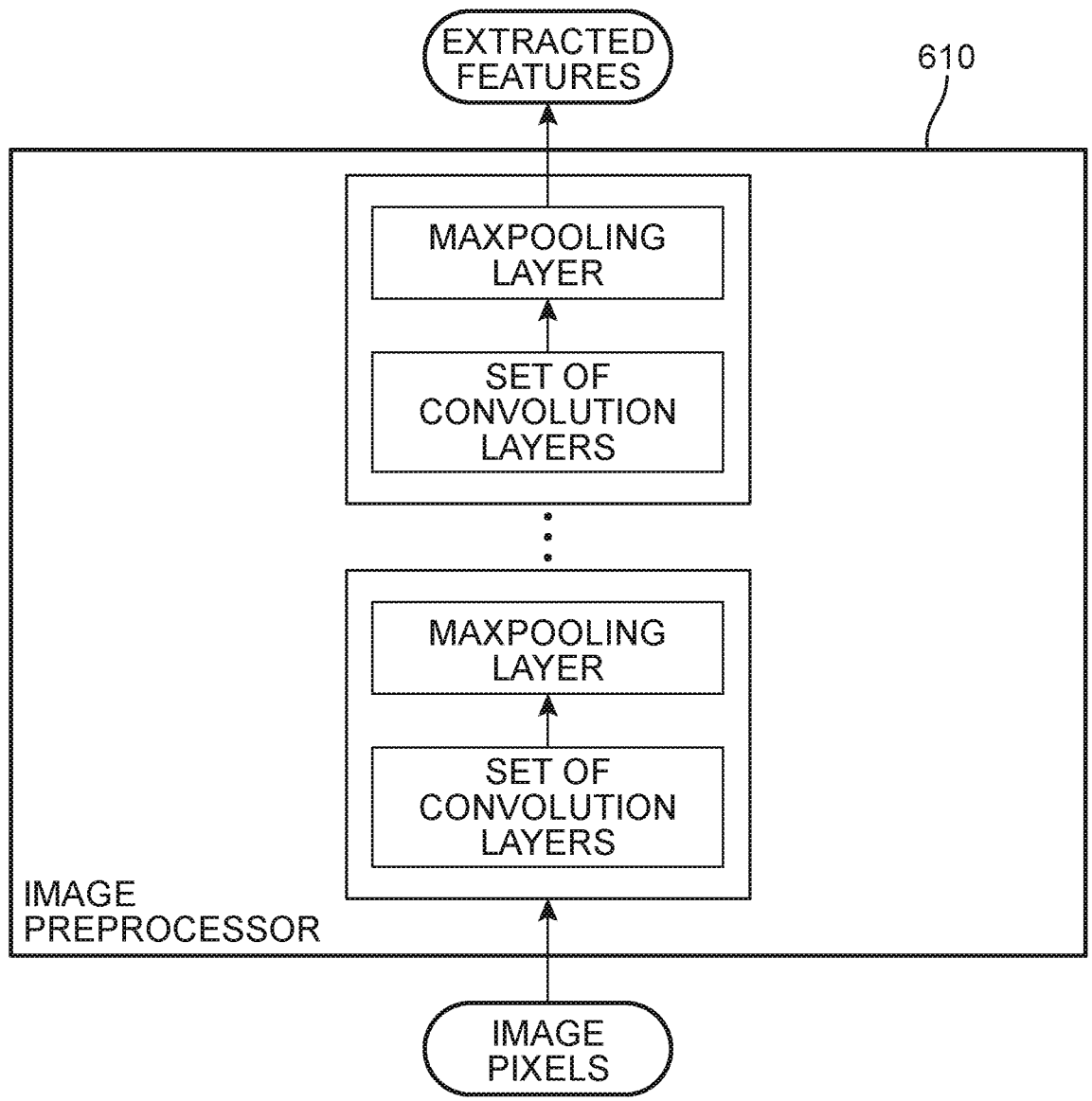
FIG. 7 is a diagram of an embodiment of an image preprocessor (preprocessing unit for images) of the feature extractor in FIG. 6.

One example of an image preprocessor 610 which receives input from the image capture device may be a visual geometry group (VGG), such as VGG16 (described by Karen Simonyan and Andrew Zisserman in "Very deep convolutional networks for large-scale image recognition." arXiv preprint arXiv:1409.1556 (2014)), which provides image classification and feature extraction. Image pixels may be the image input supplied by the image capture device to the image preprocessor of the feature extractor 510 of the interactive troubleshooting assistant 100. Since the image pixels may not be directly inputted into a deep learning model, an image preprocessor 610, such as the VGG16, can be used to preprocess the image pixels. FIG. 7 is a diagram of an embodiment of an image preprocessor (preprocessing unit for images) of the feature extractor in FIG. 6. The image preprocessor 610 may correspond to the VGG16.

The VGG16 includes convolution layers and maxpooling layers. There is a maxpooling layer after every certain number of convolution layers. More specifically, if an image preprocessor 610 receives image pixels from an image capture device, these image pixels may be processed by a set of convolution layers. A convolution layer reduces a dimension of an input by estimating the local relationships in the input. A maxpooling layer receives the reduced dimension input and further reduces the dimension of input by selecting the most important feature among the set of features provided by the corresponding set of convolution layers. In exemplary embodiments, there may be one or more maxpooling layers where each maxpooling layer has a corresponding set of convolution layers. A set of convolution layers may be one or more convolution layers. A maxpooling layer provides extracted features to an image attention layer 660 which assigns weights to the extracted features and which supplies the weighted extracted features to the actions predictor 520.

Figure 8:
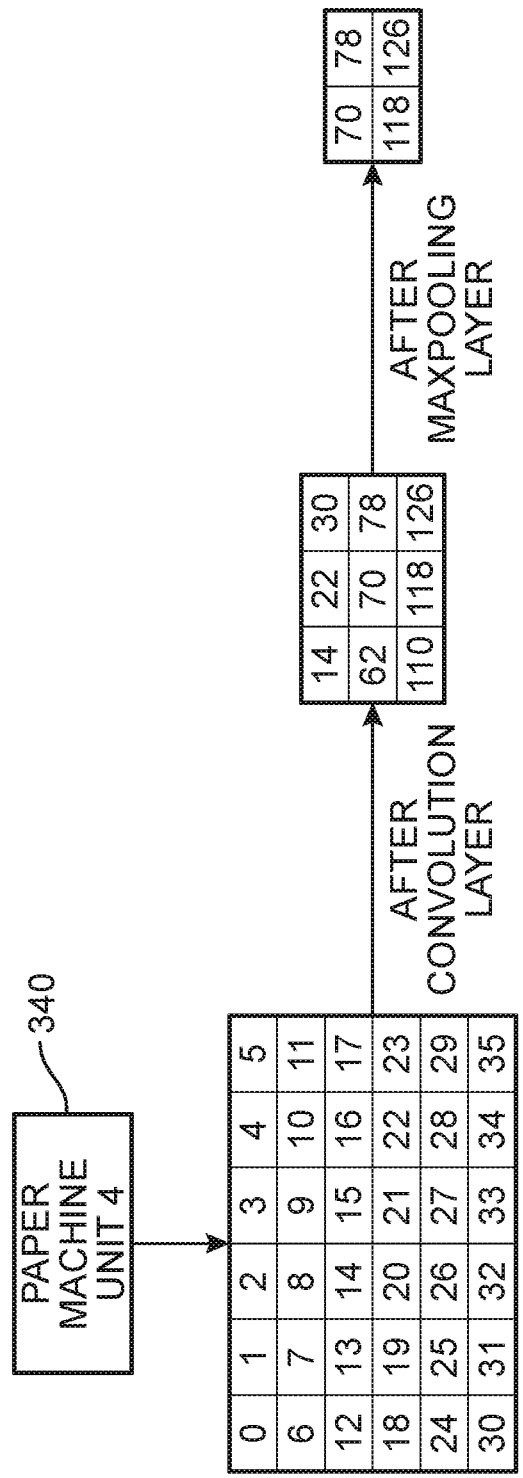
FIG. 8 is a diagram showing an example of the application of convolution and maxpooling of the image preprocessor of FIG. 7.

FIG. 8 is a diagram showing an example of the application of convolution and maxpooling of the image preprocessor of FIG. 7. More specifically, image pixels representing an image of paper machine unit 4 are shown in a six by six matrix. As indicated above, one or more convolution layers reduces a dimension of an input by estimating the local relationships in the input. For example, pixel values 0, 1, 6, and 7 in the upper left-hand side of the six by six matrix form a two by two matrix. These pixel values of the two by two matrix are added and the sum of these pixel values is 14. The sum 14 is shown in the upper righthand corner in the three by three matrix, which represents the local relation of pixels of the two by two matrix in the six by six matrix. Similarly, pixel values 2, 3, 8, and 9 of the six by six matrix are added and the sum of these pixel values is 22 as shown in the three by three matrix. In this example, the six by six matrix is divided into a group of 2 by 2 matrices so that local relationships among pixels in the six by six matrix are determined by the one or more convolution layers to provide a three by three matrix. Thereafter, a maxpooling layer is applied to the three by three matrix to provide a two by two matrix. In this example, the maxpooling layer processes the three by three matrix by determining the maximum pixel value among two by two matrices in the three by three matrix in the following manner. For example, the maximum number of a first set of pixel values 14, 22, 62, and 70 is 70, which appears at the upper left-hand corner of the two by two matrix formed after the maxpooling layer has been applied to the three by three pixel matrix. The maximum number for a second set of pixel values 62, 70, 110, and 118 is 118 as shown in the lower left-hand corner of the two by two matrix formed after the maxpooling layer has been applied to the three by three pixel matrix. The maximum number for a third set of pixel values 22, 30, 70, and 78 is 78 as shown in the upper right-hand corner of the two by two matrix formed after the maxpooling layer has been applied to the three by three pixel matrix. The maximum number for a fourth set of pixel values 70, 78, 118, and 126 is 126 as shown in the lower right-hand corner of the two by two matrix formed after the maxpooling layer has been applied to the three by three pixel matrix. The pixel values of the extracted two by two matrix represent one or more extracted features, which are forwarded to the image attention layer 660 of FIG. 6 for further processing in the feature extractor 510.

Figure 9:
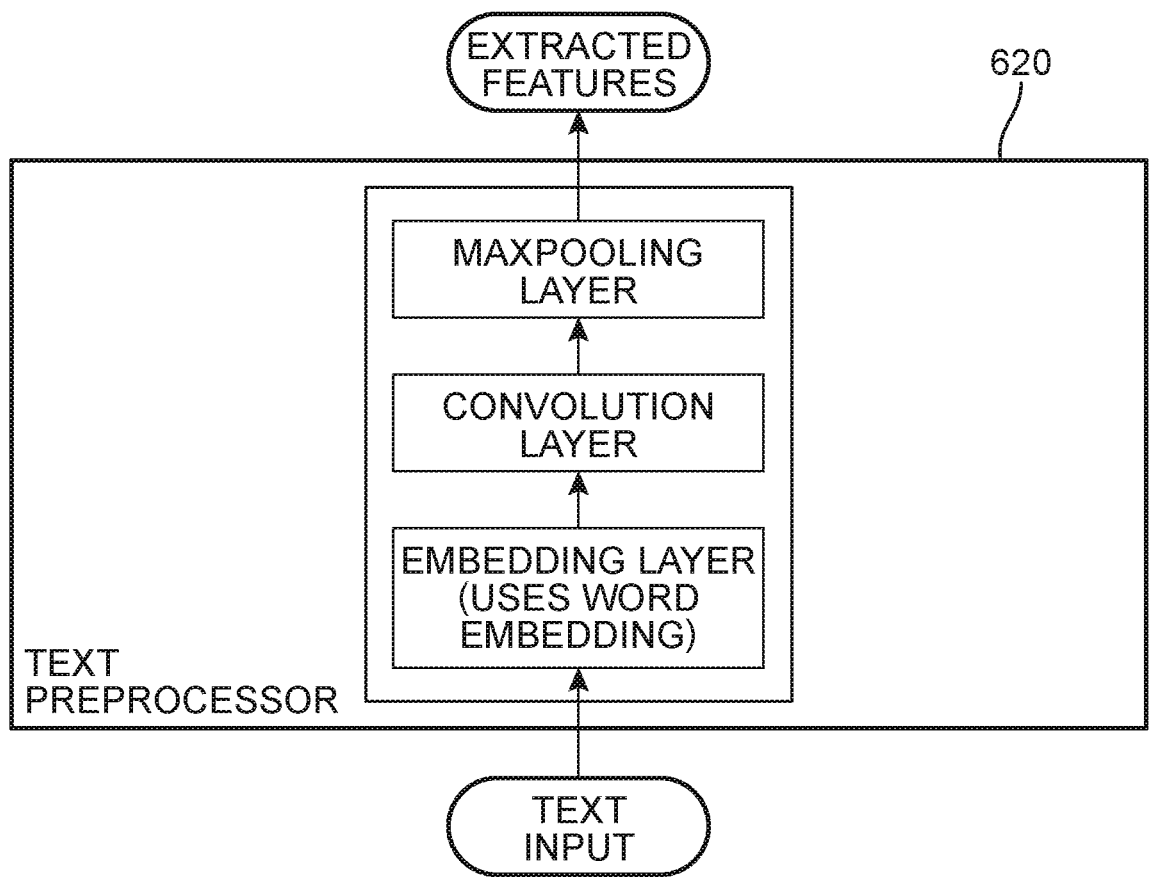
FIG. 9 is a diagram of an embodiment of a text preprocessor (preprocessing unit for text) of the feature extractor in FIG. 6.

In another example, a designated worker may input text into a mobile computing device 120 which transmits the input text to the text preprocessor 620 of the feature extractor 510 of the interactive troubleshooting assistant 100. Since text cannot be transmitted directly to a deep learning module, a text preprocessor 620 can be used to preprocess the text. FIG. 9 is a diagram of an embodiment of a text preprocessor (preprocessing unit for text) of the feature extractor in FIG. 6. As shown in FIG. 9, one example of a text preprocessor 620, which may receive input from a mobile computing device and may output extracted features to an image attention layer 670, may include an embedding layer, a convolution layer, and a maxpooling layer. An embedding layer may convert input text to a word embedding, which are a model for converting input text into one or more mathematical vectors. More specifically, the embedding layer converts words into vector representations. The embedding layer may utilize word embeddings which are semantic vector space representations that represent each word with a meaningful vector. Examples of a word embedding include a glove embedding and a word2vec embedding. These representations are received by a convolution layer to reduce the dimension of the input by estimating the local relationships in the input. The maxpooling layer receives the reduced dimension input from the convolution layer to further reduce the dimension of the input by selecting the most important feature among the set of features. The maxpooling layer provides extracted features to the text attention layer 670 which assigns weights to the extracted features and which supplies the weighted extracted features to the actions predictor 520.

Figure 10:
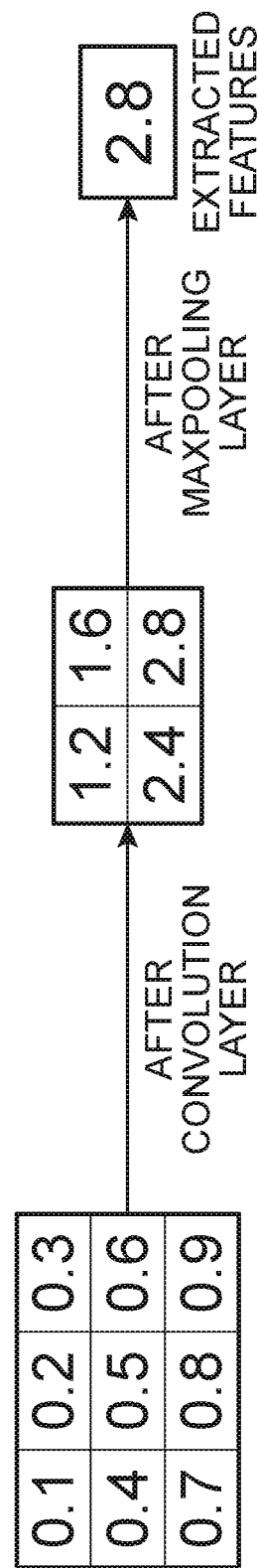
FIG. 10 is a diagram showing an example of the application of embedding, convolution and maxpooling of the text preprocessor of FIG. 9.

FIG. 10 is a diagram showing an example of the application of embedding, convolution, and maxpooling of the text preprocessor 620 of FIG. 9. In this example, word embedding is used to provide vectors corresponding to words, which are then placed in a matrix. In this example, the matrix is a three by three matrix. As indicated above, these representations of vectors are received by a convolution layer to reduce the dimension of the input by estimating the local relationships in the input. For example, the values 0.1, 0.2, 0.4, and 0.5 are added and the sum of these values is 1.2, which appears in the upper left-hand corner of the two by two matrix in FIG. 10. After the application of the convolution layer, the values 0.4, 0.7, 0.5, and 0.8 are added and the sum 2.4 appears in the lower left-hand corner of the two by two matrix of FIG. 10. After the application of the convolution layer, the values 0.2, 0.3, 0.5, and 0.6 are added and the sum 1.6 appears in the upper right-hand corner of the two by two matrix of FIG. 10. After the application of the convolution layer, the values 0.5, 0.6, 0.8, and 0.9 are added and the sum 2.8 appears in the lower right-hand corner of the two by two matrix of FIG. 10. After the convolution layer in the three by three matrix shown in FIG. 10 is applied to produce a two by two matrix shown in FIG. 10, a max pooling layer is applied to the two by two matrix in FIG. 10 and the maximum value represents the one or more extracted features of the text data, which are forwarded to the text attention layer 670 as shown in FIG. 6.

Figure 11:
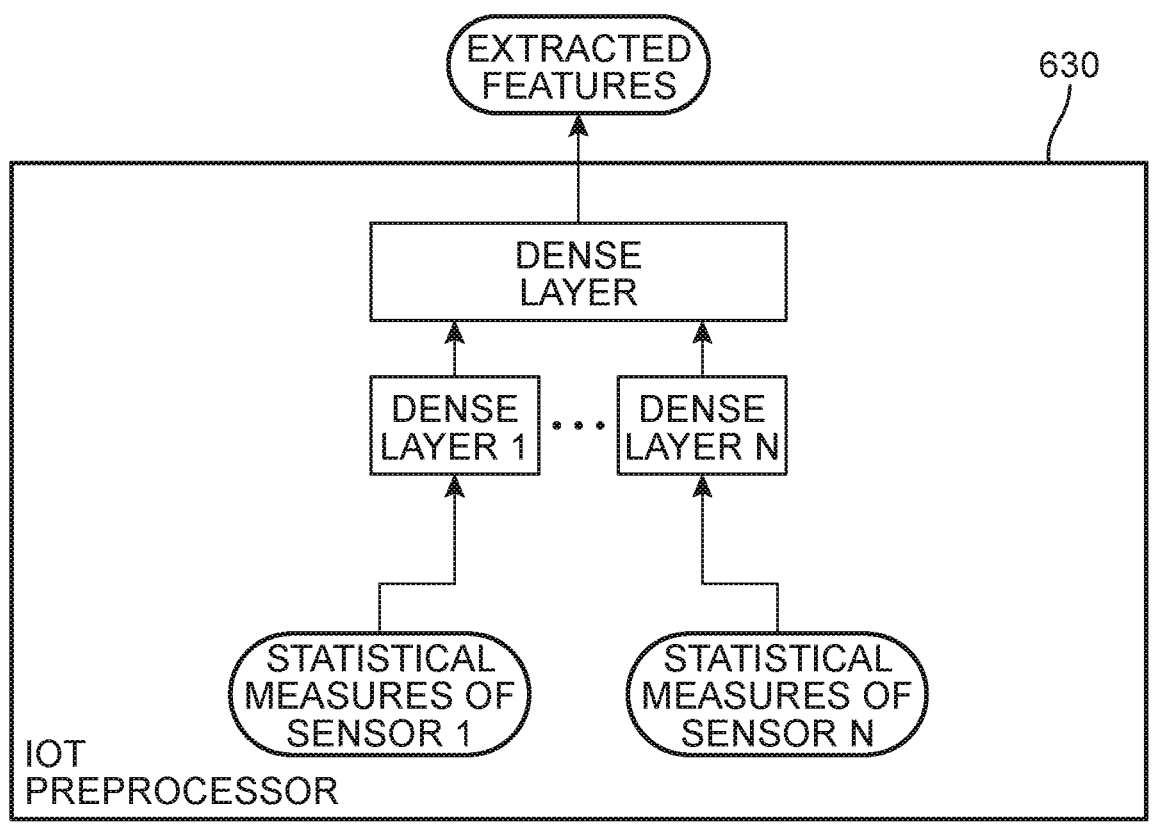
FIG. 11 is a diagram of an embodiment of an IOT preprocessor (preprocessing unit for sensor data) of the feature extractor in FIG. 6.

In another example, the interactive troubleshooting assistant 100 may receive sensor data (sensor information) from one or more IOT sensors 130 monitoring the system. Since sensor data cannot be transmitted directly to a deep learning module, an IOT preprocessor 630 can be used to preprocess sensor data. FIG. 11 is a diagram of an embodiment of an IOT preprocessor (preprocessing unit for sensor data) 630 of the feature extractor 510 in FIG. 6. One example of an IOT preprocessor 630, which may receive input from one or more IOT sensors 130 and may output extracted features to an IOT attention layer 680, may include a statistical measure and a dense layer for each IOT sensor 130. The statistical measures may include one or more of an arithmetic mean, a median, a standard deviation, a standardized moment, a kurtosis, a skewness, an entropy, and a root mean squared. The statistical measures for an IOT sensor 130 are passed to a dense layer corresponding to the IOT sensor 130. For example, the eight statistical measures of an IOT input from a first IOT sensor 130 may be represented by a tuple $(x_1, x_2, \ldots, x_8)$. However, this is an example and there may be more or less than eight statistical measures. After passing through the dense layer, these statistical measures $(x_1, x_2, \ldots, x_8)$ are mapped to a value that is some combination of all these statistical measures, i.e. $y_i = f(x_1, x_2, \ldots, x_8)$. A mapped value, representing the combination of all statistical measures, for each IOT input from each IOT sensor 130, can be represented by another tuple $(y_1, y_2, \ldots, y_n)$ where n represents the number of sensors. This tuple $(y_1, y_2, \ldots, y_n)$ may be passed to another dense layer that maps the tuple $(y_1, y_2, \ldots, y_n)$ to a value which is some combination of all of these $y_i$ ($1 \leq I \leq n$), which may be represented by $z = f(y_1, y_2, \ldots, y_n)$. The another dense layer provides extracted features to the IOT attention layer 680 which assigns weights to the extracted features and which supplies the weighted extracted features to the actions predictor 520.

Figure 12:
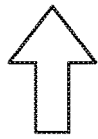
FIG. 12 is a diagram showing an example of the application of the statistical measures of the IOT preprocessor of FIG. 11.
Figure 13:
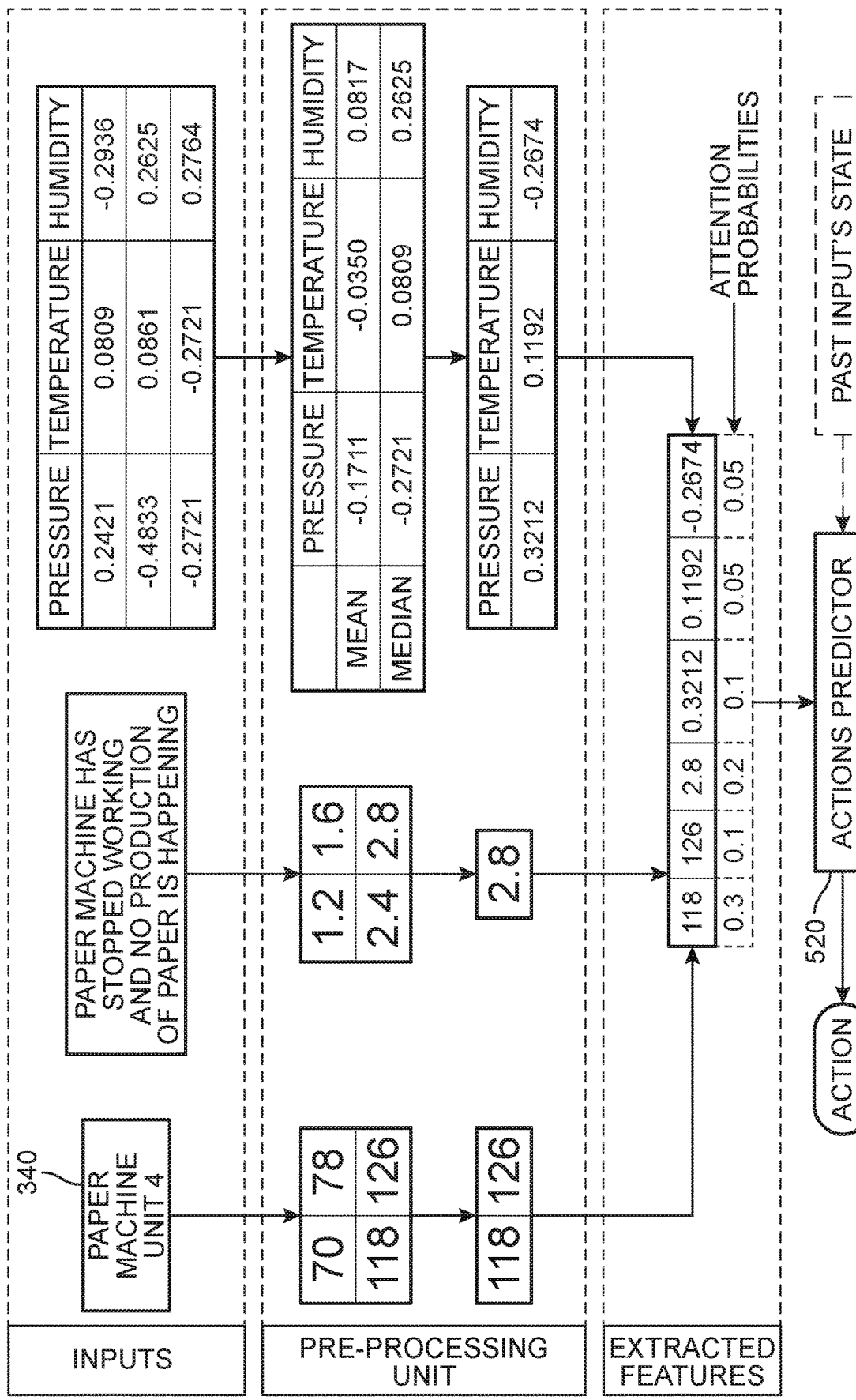
FIG. 13 is a schematic diagram of an embodiment of a troubleshooting assistant applied to a paper mill machine.

FIG. 12 is a diagram showing an example of the application of the statistical measures of the IOT preprocessor 630 of FIG. 11. FIG. 12 shows a pressure vector, a temperature vector, and a humidity vector, which are based on IOT sensor data. The IOT sensor data is then processed to provide statistical measures of the IOT sensor data to be processed by one or more dense layers. FIG. 13 shows the extracted features from the one or more dense layers (Pressure 0.3212, Temperature 0.1192, and Humidity −0.2674).

After features are extracted by the image preprocessor 610, text preprocessor 620, and IOT preprocessor 630, an attention layer 650 as shown in FIG. 6 may utilize an attention model to give importance to desired features (input features) of a multimodal input, which are extracted by using an image preprocessor 610, a text preprocessor 620, and/or an IOT preprocessor 630. As indicated above, the image preprocessor 610 may have a corresponding image attention layer 660, the text preprocessor 620 may have a corresponding text attention layer 670, and the IOT preprocessor 630 may have a corresponding IOT attention layer 680 to provide weights to extracted features. Generally, the extracted features may be multiplied with corresponding attention probabilities to give weighted features. An example of an attention model can be illustrated by the following mathematical equation:

$$(b_1, b_2, \ldots, b_n)(a_1, a_2, \ldots, a_n) = (x_1 a_1, x_2 a_2, \ldots x_n a_n)$$

The variables $b_1, b_2, \ldots, b_n$ constitute extracted features and the variables $a_1, a_2, \ldots a_n$ constitute attention probabilities. The attention probability $a_i$ indicates the significance of extracted features $b_i$ or the amount of attention that needs to be given to extracted feature $b_1$.

In an exemplary embodiment, the features, which had been extracted and weighted by the feature extractor 510, are passed to the action predictor 520 to generate a recommended action for the designated worker as shown in FIG. 5. These features passed from the feature extractor 510 to the action predictor 520 are referred to as extracted features. Based on these extracted features, the actions predictor 520 can generate the most suitable action.

FIG. 13 is a schematic diagram of an embodiment of a troubleshooting assistant 100 applied to a paper mill machine unit 4 designated by reference numeral 340, which shows the results of the image preprocessor 610, text preprocessor 620, and IOT preprocessor 130 operating on data in the examples shown in FIG. 8, FIG. 10, and FIG. 12. The most important features are concatenated as shown in FIG. 13 and attention probabilities are applied to the most important features to provide the appropriate weights to the most important features. As shown in FIG. 13, the actions predictor 520 predicts a course of action based on the information supplied by the feature extractor 510 and may also consider past input states (past image data, text data, and sensor data) as well.

Figure 14:
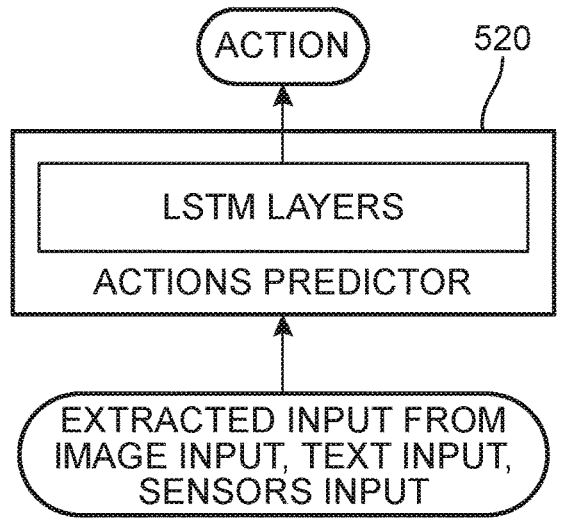
FIG. 14 is a diagram of an embodiment of an actions predictor of the trouble shooting assistant in FIG. 5 and FIG. 13.

As indicated above, actions predictor 520 is shown in FIG. 5 and FIG. 13. FIG. 14 is a is a diagram of an embodiment of an actions predictor 520 of the trouble shooting assistant 100 in FIG. 5 and FIG. 13. The action predictor 520 may include a long short term memory (LSTM) which is a deep neural network. An LSTM has the capability to bridge long time lags between inputs and can remember inputs from the past for a long duration. This capability makes the LSTM advantageous for learning long sequences.

Figure 15:
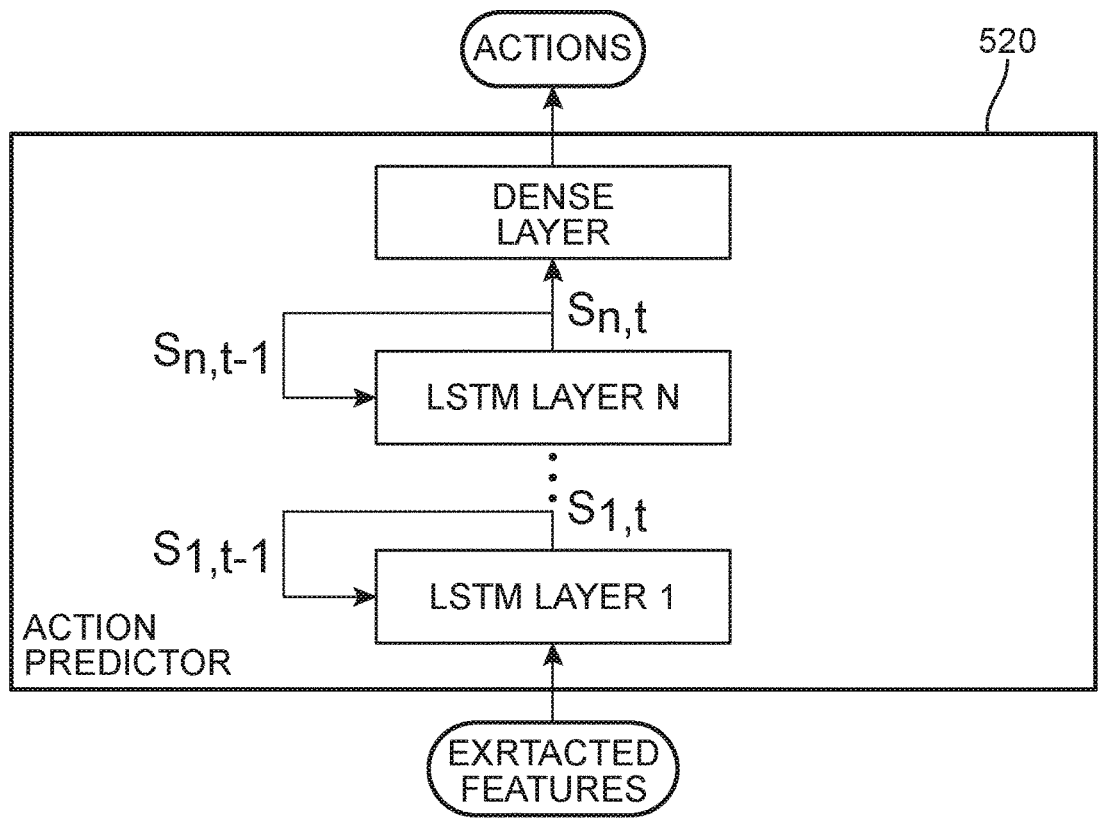
FIG. 15 shows an embodiment of an actions predictor in FIG. 14.

In an embodiment, n LTSM layers may be stacked on top of each other. FIG. 15 shows an embodiment of an actions predictor in FIG. 14. At timestamp t, the input from the previous LSTM layer as well as the previous state of the current LSTM layer at timestamp t−1 are passed to the current LSTM layer. This ensures that for any problem (issue) which has been raised, the state of the system reflected by the current input as well as the state of the system reflected by previous inputs (e.g. all previous inputs) is considered while predicting new actions. The state of the system may only be a state of part of the system as well. A dense layer is added on top of the LSTM layer to convert the output of the LSTM Layer n to the desired form for the designated worker.

Figure 16:
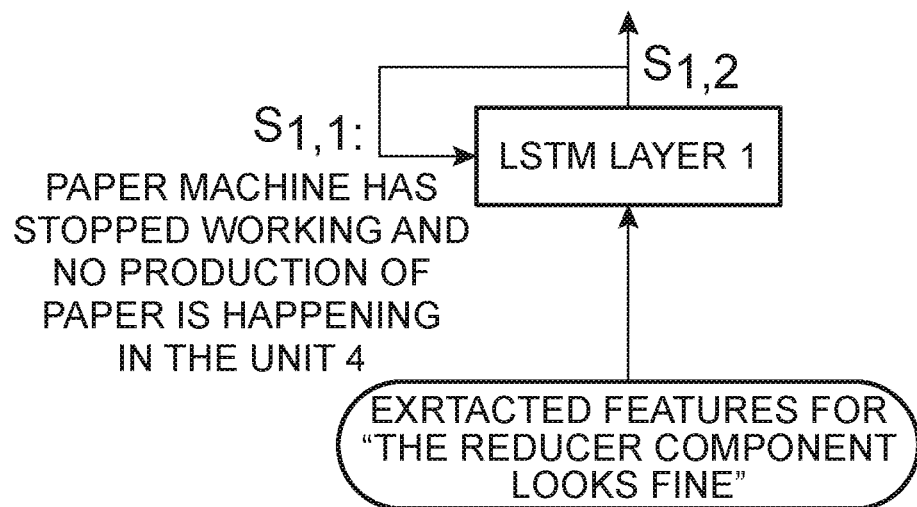
FIG. 16 shows an embodiment of an actions predictor in FIG. 14.

As shown in FIG. 16 which is applicable to the paper mill machine unit 4 of the paper mill system 300, an example of the handling of a text input is shown. If the designated worker inputs the following text "Paper machine has stopped working and no production of paper is happening in the Unit 4" at timestamp 1. The input after passing through the feature extractor 510 passes through the LSTM layers. Each LTSM layer maintains a state $S_{1,1}$ that represents this input. The last action or recommendation predicted by the actions predictor 520 is "Check Reducer Component." The designated worker may give the next input "The Reducer Component Looks Fine" at timestamp 2. When this new input passes through the LTSM layers, the state $S_{1,1}$ as well as the new worker input is considered to predict the new state $S_{1,12}$.

The interactive troubleshooting assistant 100 outputs the recommended action, provided by the action predictor 520, to one or more mobile computing devices 120 so the designated workers receive the recommended action. As discussed above, once the recommended action is performed, the status of the system after the action is taken is evaluated by the interactive troubleshooting assistant 100, which analyzes the new information (new data) from new images, new text input, and/or new IOT sensor data generated after the action is performed, and the interactive troubleshooting assistant 100 provides the next recommended action. This process may be repeated until the repair is complete. By dynamically changing the recommended action until the repair to the system is completed, the overall repair time may be greatly reduced.

Although the above embodiments have referred to dispatching one or more field engineering, technician, or robots (designated worker), the designated worker may also be any other machine, and the user of the interactive troubleshooting assistant 100 may a robot or machine which uses or includes a mobile computing device 120, which has an application for communication with the interactive troubleshooting assistant 100.

Figure 17:
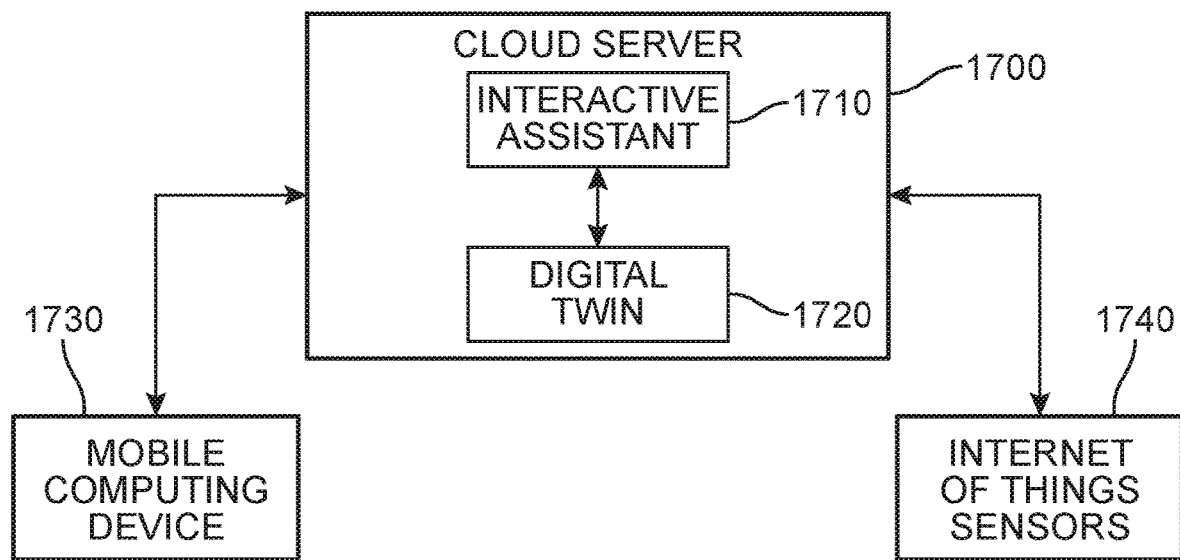
FIG. 17 is a block diagram of an embodiment of an interactive assistant.

In another example, FIG. 17 shows a block diagram of an embodiment of an interactive assistant 1710 hosted by a cloud server 1700 and coupled to a mobile computing device (portable electronic device) 1730 and internet of things (IOT) sensors 1740 through the cloud server 1700. The interactive assistant 1710 may be coupled to a digital twin 1720, which is also hosted by the cloud server 1700. A digital twin 1720 is a digital representation of one or more physical objects. A digital twin 1720 may provide a virtual replica of physical objects such as buildings, machines, components, robots, and persons. The digital twin 1720 may also provide identification information of physical objects as well as the physical characteristics, properties, and or uses of the physical objects. In addition, the digital twin 1720 may provide a history of the use of a physical objection. All of this information provided by digital twin 1720 may be referred to as digital twin information.

Although the interactive assistant 1710 hosted by a cloud server 1700 is shown coupled to one mobile computing device 1730 in FIG. 1, other embodiments may include one or more mobile computing devices 1730. The cloud server 1700 may also be coupled wirelessly to one or more mobile computing devices 1730 and may be coupled wirelessly or directly to IOT sensors 1730. Along with the digital twin information provided by digital twin 1720 to the interactive assistant 1710, the IOT sensors 1730 provide IOTs sensor data (IOT sensor information) to the interactive assistant 1710 hosted on the cloud server 1700, so that the interactive assistant 1710 can monitor the state (condition) of a system to identify or anticipate problems or issues which may cause or have caused one or more failures in the monitored system. Although a cloud server 1700 is shown as an embodiment in FIG. 17 and other figures, any hosted server or a plurality of hosted servers may be used. One or more cloud servers may be used. Any of these one or more cloud servers may be public or private.

Figure 18:
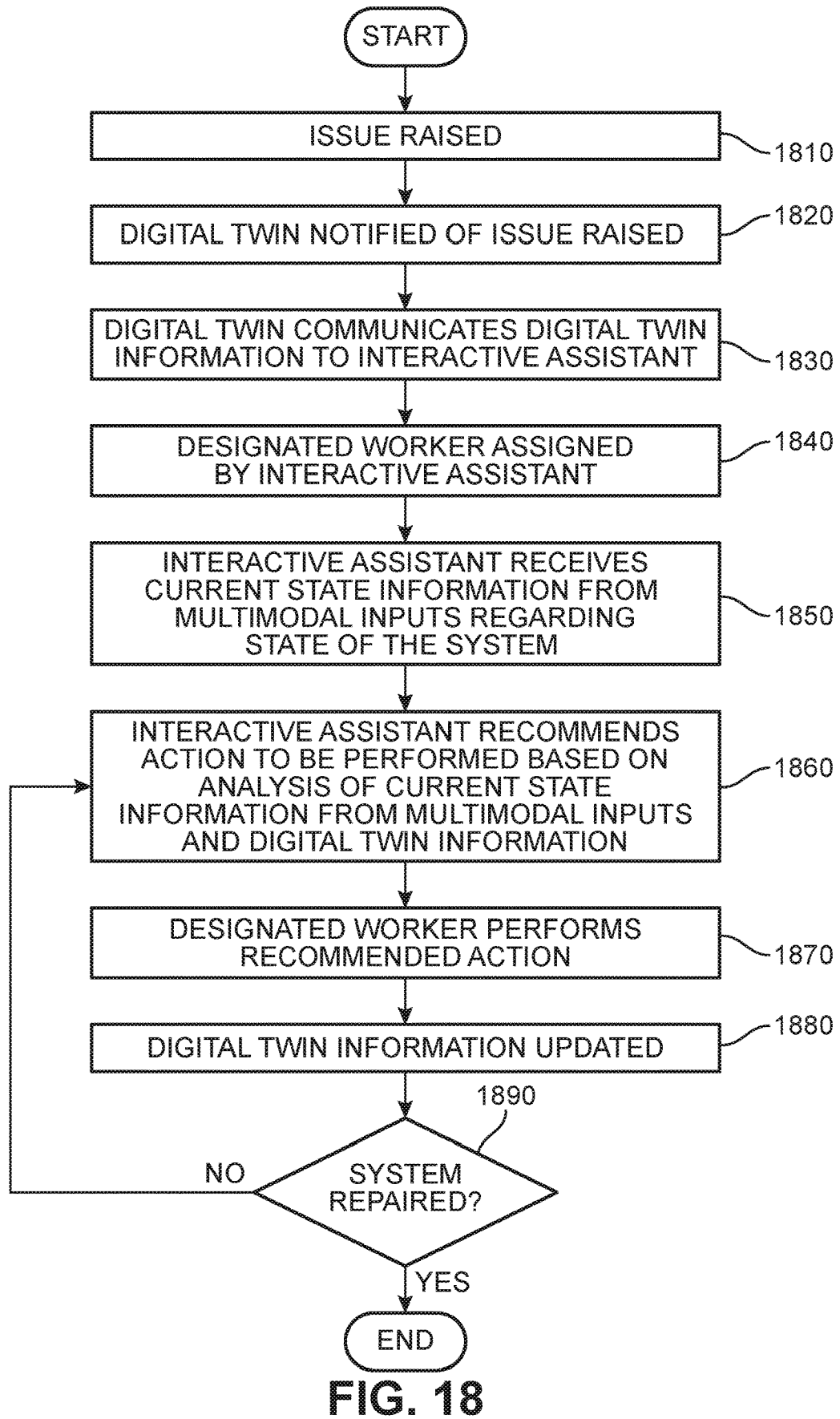
FIG. 18 shows an embodiment of a method of troubleshooting a system for dynamically recommending one or more actions for repairing the system.

FIG. 18 shows an embodiment of a method of troubleshooting a system for dynamically recommending one or more actions for repairing the system by accessing a digital twin 1720 in addition to other information such as the sensor data supplied by the internet of things sensors 1730. As discussed above, the interactive assistant 1710 monitors the state of a system and detects any issues (problems) that are raised (operation 1810). One or more issues (problems) are raised (detected) by an analysis of the IOT sensor data which is received by the interactive assistant 1710 (operation 1810). The digital twin 1720 is notified of the issue raised (operation 1820) and the digital twin may communicate digital twin information to the interactive assistant (operation 1830). Alternatively, once the issues is raised (operation 1810), the interactive assistant 1710 accesses the digital twin 1720 to request digital twin information.

After at least one issue (problem) has been raised and the digital twin 1720 has communicated with the interactive assistant 1710, the interactive assistant 1710 assigns a designated worker to inspect (investigate) the one or more issues (problems) (operation 1840) raised as a result of the monitoring by the interactive assistant 1710 in operation 200. This assignment is based on one or more issues being raised as well as digital twin information provided by the digital twin 1720. In addition, as part of the designated worker assignment, the interactive assistant 1710 may also recommend that one or more tools and/or one or more parts be taken by the designated worker to the area (location) of the raised issue (operation 1840). The interactive assistant 1710 may receive multimodal inputs regarding the state of the system (operation 1850). These multimodal inputs may include the initial IOT sensor data, one or more images (image data), and text (text data). The image data may be collected and provided to the interactive assistant 1710 by an image capture device (e.g., a camera), which is part of the system, or by one or more image capture devices of one or more mobile computing devices 1730. The captured image data may include one or more images of a component of the system and/or an area around the component of the system that the designated worker has been sent to investigate. The designated worker may possess one or more mobile computing devices 1730. Examples of the one or more mobile computing devices 1730 include a smartphone, a tablet, a smartwatch, a smart glass, a smart helmet, and a laptop, which can communicate wirelessly with the interactive assistant 1710 hosted by the cloud server 1700. The designated worker may use the one or more mobile computing devices 1730 to input text which is wirelessly communicated to the interactive assistant 1710 hosted by the cloud server 1700 (operation 1850). An application may be installed on the one or more mobile computing devices 1730 to communicate with the interactive troubleshooting assistant 1710 to supply information to the interactive troubleshooting assistant 1710 or to receive recommended actions from the interactive troubleshooting assistant 1710.

Based on an analysis of the multimodal inputs and the digital twin information, the interactive assistant 1710 recommends that the designated worker perform an action (operation 1860). Examples of a designated worker include a technician, a field engineer, and a robot. The robot may be an autonomous robot. The designated worker may be a user. In the disclosure, the designated worker may refer to one or more designated workers. In addition, if the designated worker is a robot, the mobile computing device 1730 may be embedded in the robot (may be a part of the robot), may be held by the robot, or may be worn by the robot. These configurations are intended to be examples.

After the designated worker receives the recommended action through the mobile computer device 1730 from the interactive assistant 1710 (operation 1860), the designated worker performs the recommended action (operation 1870) and the digital twin information in the digital twin 1720 is updated (operation 1880). Thereafter, the interactive assistant 1710 receives additional data (additional information) from one or more multimodal inputs regarding the state of the system after the recommended action is performed. The interactive troubleshooting assistant 1710 determines whether the system is repaired based on multimodal inputs received by the interaction assistant 1710 and the updated digital twin information after the recommended action is performed (operation 1890). These multimodal inputs may include one or more of IOT sensor data, images (image data), or text (text data). When the interactive assistant 1710 determines that the system is repaired (one or more issues or problems resolved) (operation 1890), the interactive assistant 1710 recognizes the problem or issue has been repaired and continues to monitor the system to detect any new issues or problems. When the interactive assistant 1710 determines that the system is not repaired (operation 1890), then the interactive assistant 1710 returns to operation 1860 so that another action can be recommended to the designated worker (operation 1860) followed by operations 1870, 1880, and 1890 until the interactive assistant 1710 determines that the system is repaired. The interactive assistant 1710 considers new information (new data) including updated digital twin information and multimodal inputs after each action is performed and recommends the next action until the system is repaired, so that the amount of time required to diagnose the one or more problems and the amount of time required for repair of the system decreases.

Figure 19:
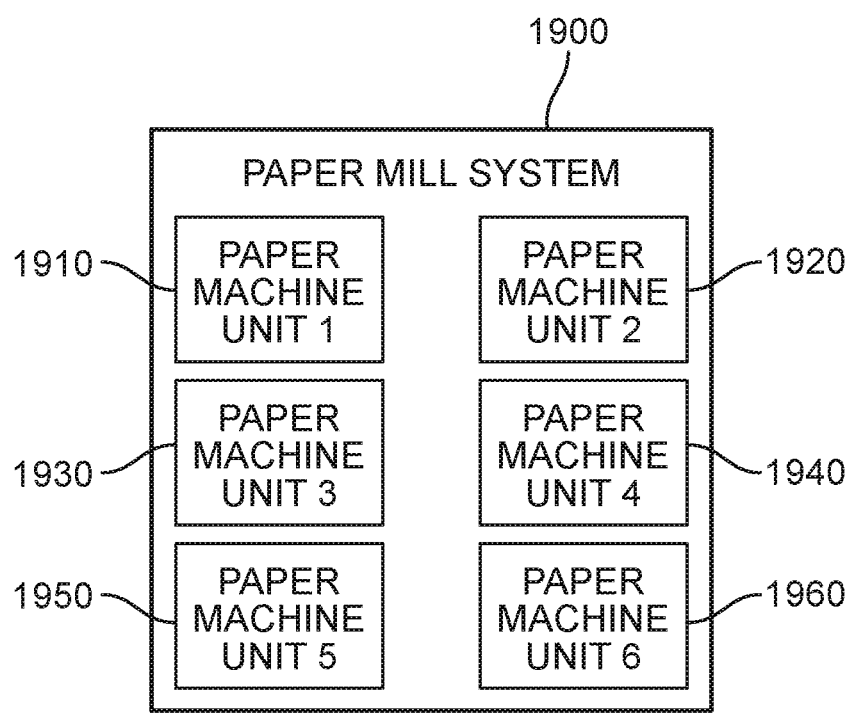
FIG. 19 is a block diagram of an example of a paper mill system including paper machines for troubleshooting.

FIG. 19 is a block diagram of an example of a paper mill system 1900 including paper machine units (paper machines) 1910-1960, which can be monitored by the interactive assistant 1710 to detect any issues (problems) caused by one or more failures in the paper mill system. Each paper machine 1910-1860 has components. In this example, the digital twin 1720 may store digital twin information of the paper mill system 1900 which include digital twin information regarding paper machine units 1910-1960 any components related to the paper machine units 1910-1960. The cloud server 1700 hosts the digital twin 1720 which includes the digital twin information of paper mill system 1900.

Figure 20A:
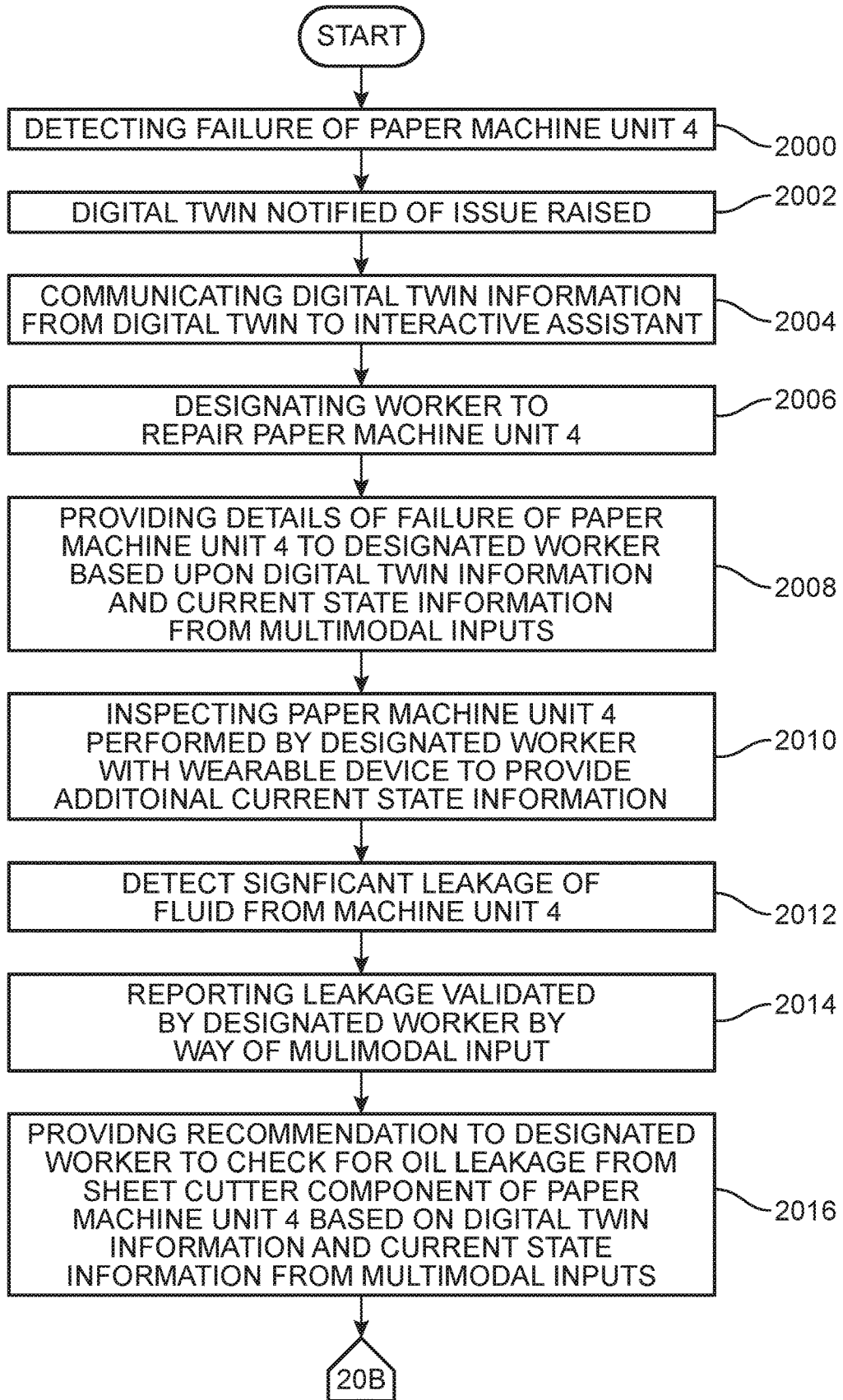
FIGS. 20A, 20B, and 20C show an example of an embodiment of a method of troubleshooting the paper mill machines in the paper mill system in FIG. 19.
Figure 20B:
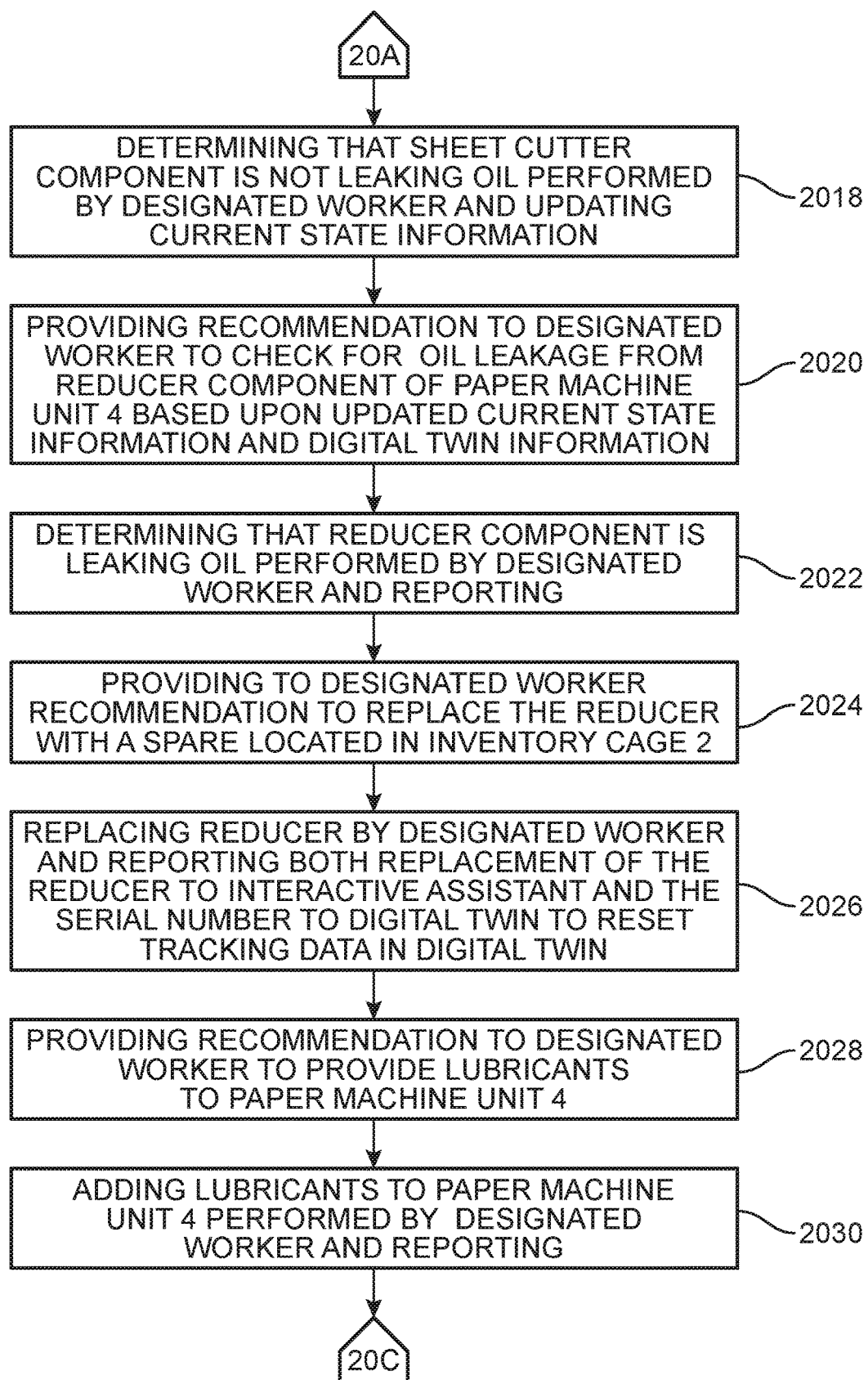
Figure 20C:
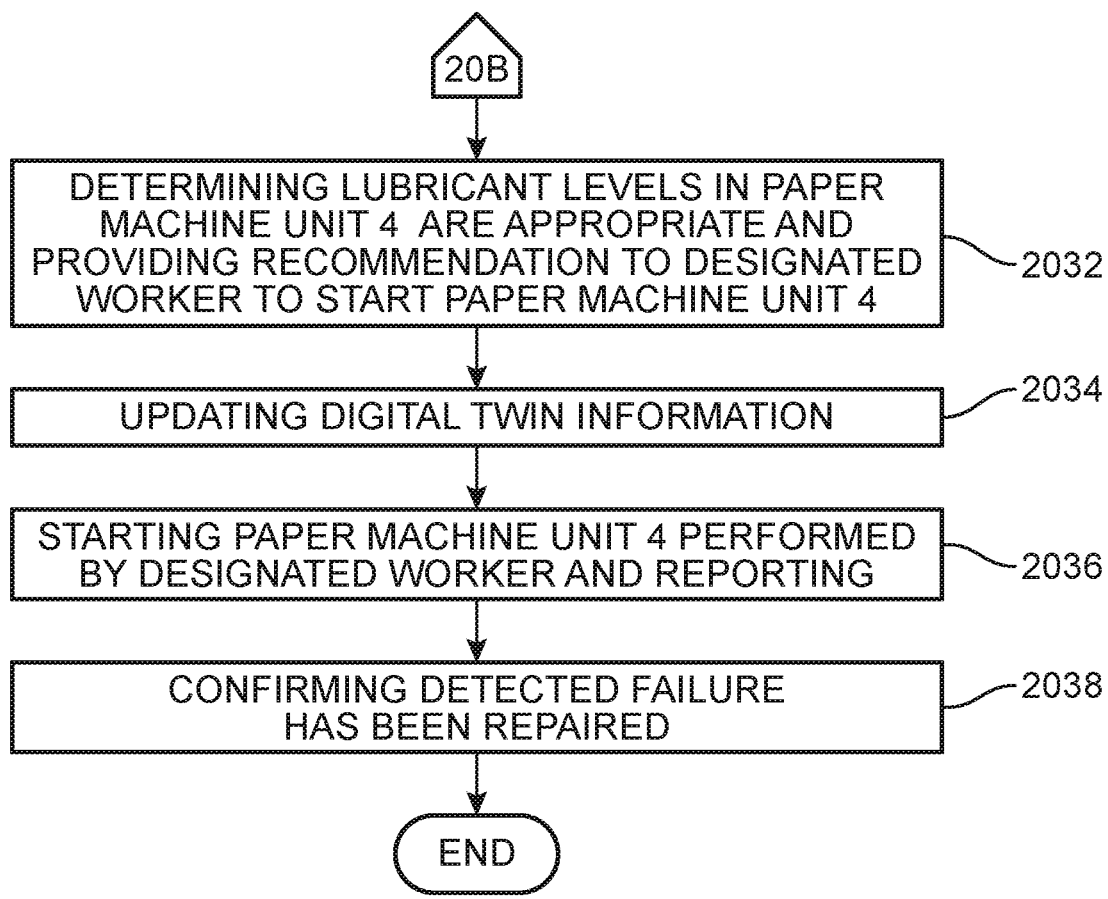

FIGS. 20A, 20B, and 20C show an example of an embodiment of a method of troubleshooting the paper mill machines in the paper mill system in FIG. 19 by using the interactive assistant 1710 in FIG. 17 and the interactive trouble shooting method shown in FIG. 18.

In the example shown in FIGS. 20A, 20B, and 20C, a failure is detected in paper machine unit 4 designated by reference numeral 1940 of the paper mill system 1900 by the interactive assistant 1710 shown in FIG. 17 (operation 2000). Operation 2000 in FIG. 20A generally corresponds to operation 1810 (issue raised) in FIG. 18. The IOT sensors 1740 of FIG. 17 provide IOTs sensor data (IOT sensor information) to the interactive assistant 1710 hosted on the cloud server 1700, so that the interactive assistant 1710 can monitor the state (condition) of a system to identify or anticipate problems or issues which may cause or have caused one or more failures in the monitored system. One or more issues (problems) are raised (detected) by an analysis of the IOT sensor data received by the interactive assistant 1710 (operation 2000). After the interactive assistant 1710 detects the failure in paper machine unit 4, this exemplary method notifies a digital twin that an issue has been raised (operation 2002). Operation 2002 generally corresponds to operation 1820 in FIG. 18. The digital twin 1720 is notified of the issue raised (operation 2002) and the digital twin may communicate digital twin information to the interactive assistant (operation 2004). Operation 2004 generally corresponds to operation 1830 in FIG. 18. Alternatively, once the issues is raised (operation 2000), the interactive assistant 1710 accesses the digital twin 1720 to request digital twin information.

The interactive assistant 1710 designates a worker (designated worker) to repair paper machine unit 4 (operation 2006). Operation 2006 in FIG. 20A generally corresponds to operation 1840 in FIG. 18. This assignment is based on one or more issues being raised as well as digital twin information provided by the digital twin 1720. In addition, as part of the designated worker assignment, the interactive assistant 1710 may also recommend that one or more tools and/or one or more parts be taken by the designated worker to the area (location) of the raised issue (operation 2006).

In addition, the interactive assistant 1710 may provide information to the designated worker by communicating with one or more mobile computing devices 1730 provided to the designated worker. An example of this information is the conveyor belt in paper machine unit 4 has failed (operation 2008). Operations 2006 and 2008 in FIG. 20A may be generally performed by operations 1830 through 1860 in FIG. 18. However, operation 1860 in FIG. 18 can apply to other operations in FIGS. 20A-20C.

In this example, after receiving information from the interactive assistant 1710 through one or more mobile computing devices 1730, the designated worker visually inspects paper machine unit 4 and collects image data through an image capture device of a wearable device (operation 2010). A wearable device is an example of a mobile computing device 1730. The image capture device provides one or more images of a significant leakage of fluid from machine unit 4 (operation 2012). In this example, the image data is wirelessly communicated to the interactive assistant 1710 in operation 2012, and the image data is validated by a text transmitted to the interactive assistant 1710 by way of a mobile computing device 120 (operation 2014). The interactive assistant 1710 provides a recommendation to the designated worker based on the image data, the text data, and IOT sensor data provided by IOT sensors 1740. In operation 2016, the interactive assistant 1710 recommends that the designated worker check for oil leakage from a sheet cutter component of paper machine unit 4 (operation 2016). Operations 2008-2016 of FIG. 20A may be generally performed by operations 1850 and 1860 in FIG. 18.

The designated worker performs the recommended action of checking the sheet cutter or machine unit 4 for leakage and determines that the sheet cutter has not leaked. The designated worker also reports this determination to the interactive assistant 1710 (operation 2018 in FIG. 20B). Operations 2016 and 2018 may be generally performed by applying operations 1870 through 1890 of FIG. 18. As indicated in operation 2020, another recommendation is made to the designated worker, which is similar to the operation 1860 in FIG. 18. More specifically, in operation 2020, the interactive assistant 1710 provides the designated worker with the recommendation to check a reducer of the paper machine unit 4 for leakage. This recommendation may be based upon an indication from digital twin 1720 that the reducer is nearing the end of recommended usage (e.g. 2,000 hours of use). If the digital twin 1720 indicated that the reducer was new, a different recommendation by the interactive assistant 1710 may have been made. The designated worker performs the action of inspecting the reducer and determines that the reducer component of paper machine unit 4 is leaking and the designated worker reports this determination to the interactive assistant 1710 (operation 2022).

After the interactive assistant 1710 determines that the reducer of the paper machine unit 4 is leaking fluid, the interactive assistant 1710 provides the designated worker with a recommendation to replace the reducer with a spare located in an inventory cage 2 (operation 2024) in this example. The designated worker replaces the reducer, the replacement of the reducer is reported to interactive assistant 1710, and the serial number is reported to the digital twin 1720 to reset the tracking data in the digital twin through the interactive assistant 1710 (operation 2026). The interactive assistant 1710 also recommended that the designated worker provide additional lubricants (fluids) to paper machine unit 4 (operation 2028), and the designated worker performed the action of applying lubricants to paper machine unit 4 (operation 2030). Thereafter, the IOT sensors 1740 provide IOT sensor data to the interactive assistant 1710 including sensor data indicating the lubricant levels in paper machine unit 4 are satisfactory. Therefore, the interactive assistant 1710 recommends a next action to the designated worker, which is to start paper machine unit 4 (operation 2032 in FIG. 20C). The digital twin information in digital twin 1720 is updated through one or more communications from the interactive assistant 1710 to provide any additional updates to the digital twin 1720 (operation 2034). The designated worker starts paper machine unit 4 and reports the starting of the paper machine unit 4 to the interactive assistant 1710 (operation 2036). The designated worker may report to the interactive assistant 1710 by the mobile computing device 1730. The designated worker may confirm that the detected failure has been repaired and report this confirmation to the interactive assistant 1710 (operation 2038). Alternatively, the designated worker and interactive assistant 1710 may both confirm that the detected failure has been repaired (operation 4038).

Figure 21:
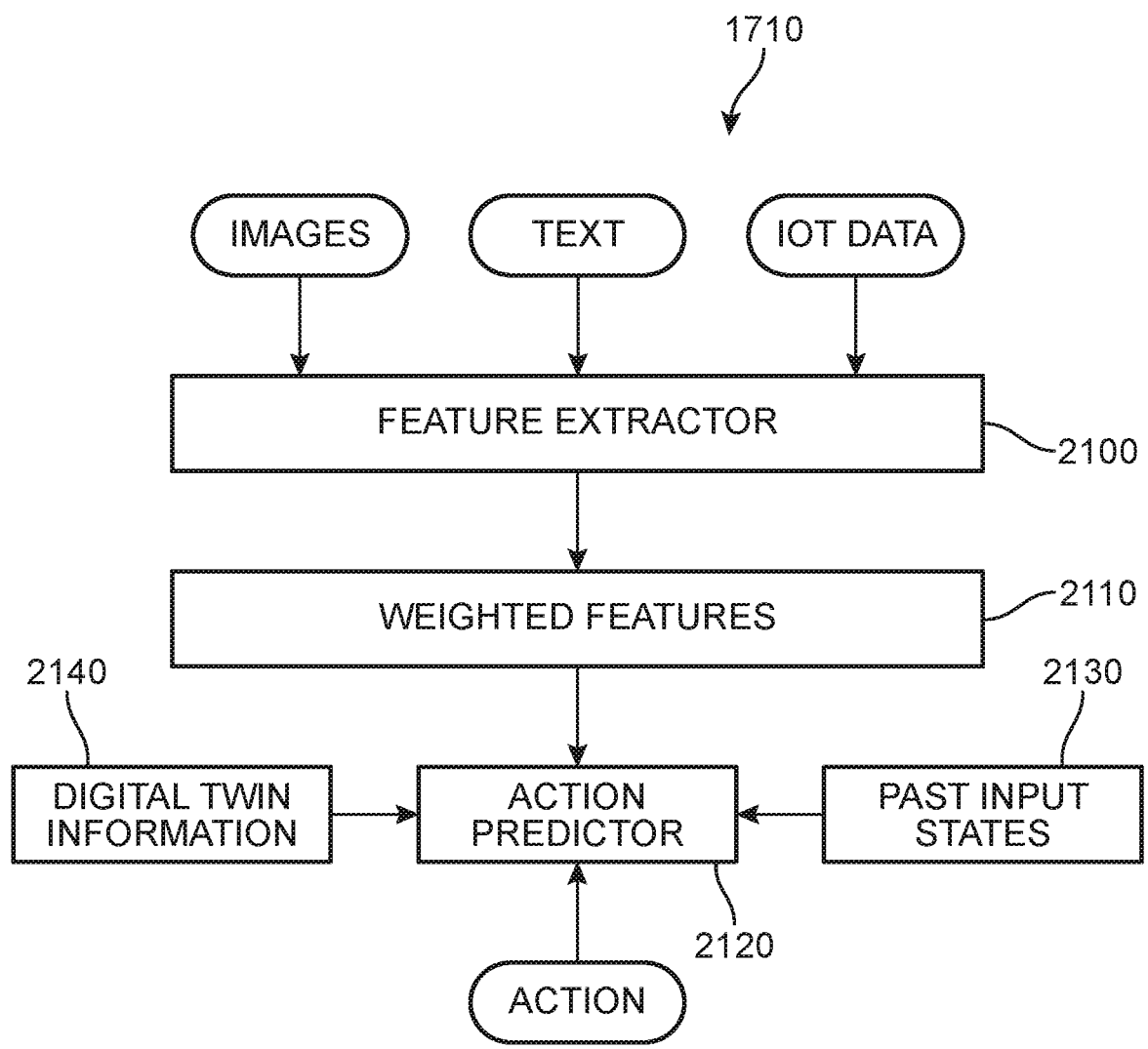
FIG. 21 is a diagram of an embodiment of an interactive assistant.

FIG. 21 is a diagram of an embodiment of an interactive assistant 1710 which is configured to access past input states 2130 and digital twin information 2140. In an embodiment, a cloud server 1700 hosts or includes the interactive assistant 1710. The interactive assistant 1710 in FIG. 21 may include the feature extractor 2100 which is similar to the feature extractor 510 of FIG. 5, which converts multimodal inputs into a structured form which is suitable for an action predictor 2120, which recommends a course of action to be performed. Placing the multimodal inputs into the structure form includes applying weights to extracted features as denoted by reference numeral 2110. The action predictor 2120 also receives digital twin information 2140 and past input states of multimodal inputs in order to recommend a course of action. The actions predictor 2120 may predict a course of action based on the information supplied by the feature extractor 2100, past input states (past image data, text data, and sensor data) from the multimodal inputs, and digital twin information. Although a private cloud server is one embodiment which hosts the digital twin 1720 and interactive assistant 1710, any privately hosted server or a plurality of privately hosted servers may be used. One or more private cloud servers may be used. In addition, one or more public cloud servers may be used.

Figure 22:
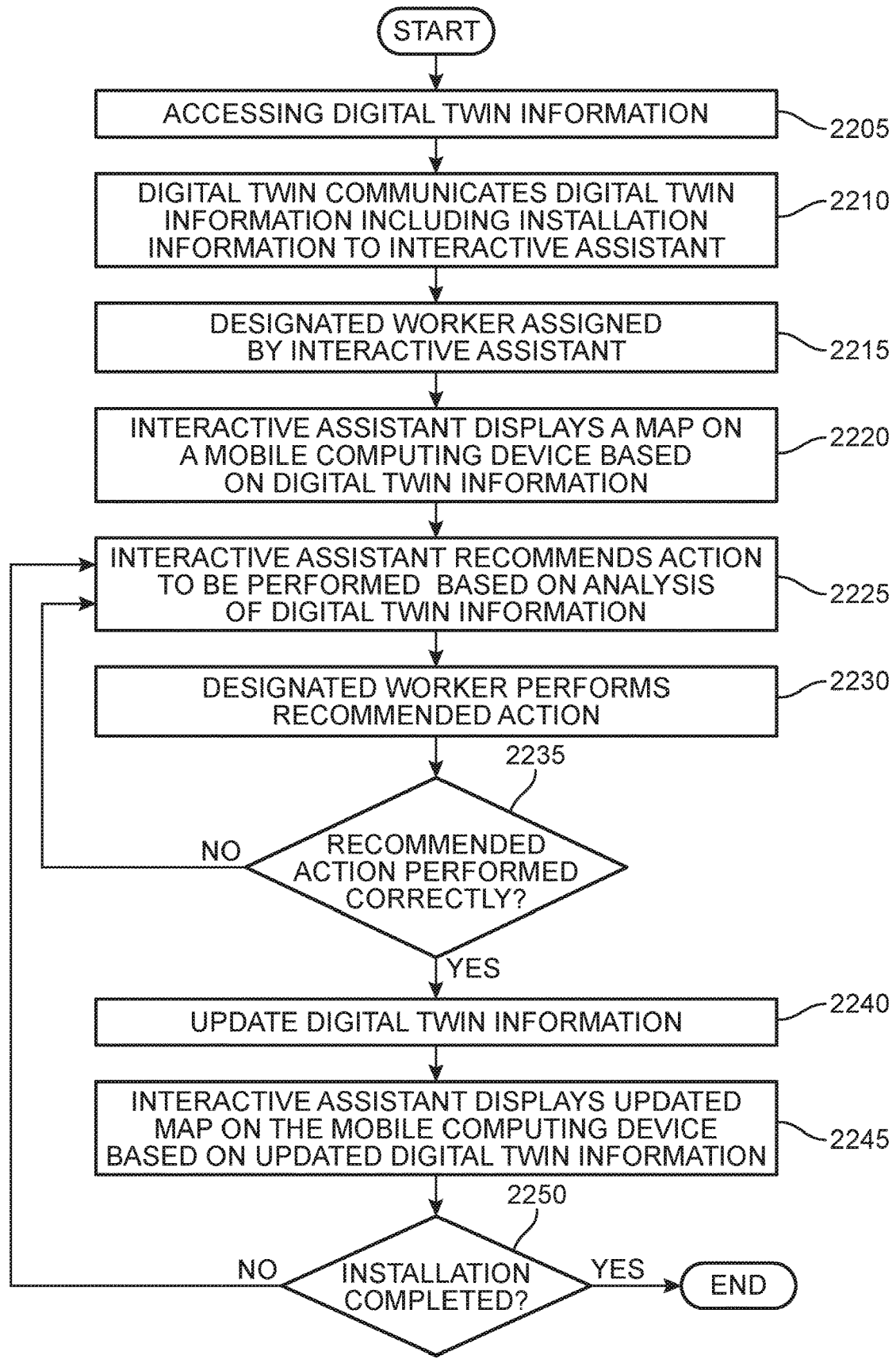
FIG. 22 shows an embodiment of a method of installing a system by dynamically recommending one or more actions for installing the system.

FIG. 22 shows an embodiment of a method of installing a system by dynamically recommending one or more actions for installing the system. In order to install a system, the interactive assistant 1710 accesses the digital twin 1720 to obtain digital twin information (operation 2205). As discussed above, a digital twin 1720 may provide a virtual replica of physical objects such as buildings, machines, components, robots, and persons. The digital twin 1720 may also provide identification information of physical objects as well as the physical characteristics, properties, and or uses of the physical objects. In addition, the digital twin 1720 may provide a history of the use of a physical objection. All of this information provided by digital twin 1720 may be referred to as digital twin information.

The digital twin 1720 communicates digital twin information including installation information to the interactive assistant 1710 (operation 2210). Based on the digital twin information, a designated worker is assigned by the interactive assistant (operation 2215). The designated worker has a mobile computing device 1730 which may have an application which allows the computing device 1730 to communicate with the interactive assistant 1710. As a result of this communication, the interactive assistant 1710 communicates with the mobile computing device 1730 to display on a display of the mobile computing device 1730 a map based on the digital twin information supplied by the digital twin 1720 through the interactive assistant 1710 (operation 2220).

The interactive assistant recommends an action to be performed based on an analysis of the digital twin information (operation 2225). The recommended action may be communicated to the designated worker through the mobile computing device 1730 using a display to display the recommended action (operation 2225). The mobile computing device 1730 may also have a speaker so that the recommended action may be communicated through a speaker (operation 2225). The designated worker performs the recommended action (operation 2230). If the recommended action is not performed correctly (operation 2235), the method may return to operation 2325 so that the designated worker receives a recommended action. If the recommended action is performed correctly, the interactive assistant 1710 communicates with the digital twin 1720 to update the digital twin information (operation 2240). The interactive assistant 1710 communications with the mobile computing device 1730 to display an updated map on the mobile communication device 1730 based on the updated digital twin information (operation 2245). If the installation is completed (operation 2250), then the installation ends. However, if the installation is incomplete, the method returns to operation 2225 for the next recommended action to perform to install the system until the system is installed.

Although the above embodiments have referred to dispatching one or more field engineering, technician, or robots (designated worker), the designated worker may also be any other machine, and the user of the interactive assistant 1710 may a robot or machine which uses or includes a mobile computing device 1730, which has an application for communication with the interactive assistant 1710 which can access the digital twin 1720.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of installing a system by dynamically recommending actions for system installation, the method comprising:
    accessing initial digital twin information from a digital twin stored on a cloud server through an interactive assistant stored on the cloud server for system installation;
    analyzing the initial digital twin information to detect a system failure;
    assigning a designated worker by the interactive assistant for system installation based on the analysis of the initial digital twin information, wherein the designated worker is a robot and a mobile computing device is embedded in the robot;
    displaying an installation map on a display of the mobile computing device based on the initial digital twin information provided to the mobile computing device through the interactive assistant;
    performing system installation by repeatedly performing operations until determining that the system failure is repaired, the operations comprising:
        receiving images from an imaging device and text from the mobile computing device and storing the images as image data and the text as text data in the cloud server, wherein the images show one or more components of the system being installed and the text includes input from the designated worker;
        receiving updated digital twin information;
        determining whether the failure is repaired based on the image data, text data, and updated digital twin data;
        upon determining that the failure is not repaired, determining a first action to be performed by the designated worker based on analysis of the image data, text data, and the initial digital twin information, wherein the first action includes checking for an issue with a first component;
        upon receiving a communication from the designated worker that the issue does not exist with the first component, recommending that the designated worker check for the issue with a second component;
        upon receiving a communication from the designated worker that the issue exists with the second component, determining a second action to be performed by the designated worker based on analysis of the image data, text data, and the initial digital twin information; and
        recommending the second action to the designated worker via communication to the mobile computing device from the cloud server;
    and
    displaying that the failure is repaired on the display of the mobile computing device after the system is installed based on analysis of the interactive assistant.

2. The method of claim 1, wherein determining the second action includes:
    converting the image data, text data, and updated digital twin data into a structured form, extracting features from the structured form, and applying weights to extracted features to create weighted features;
    applying an action predictor including deep neural network layers to the weighted features to generate the second action.

3. The method of claim 1, wherein the initial digital twin information comprises a virtual representation of the system installed in a building or a virtual representation of a component for the system.

4. The method of claim 1, wherein the issue is an oil leak.

5. The method of claim 1, further comprising recommending a tool for the designated worker to use based on analysis of the image data, text data, and the initial digital twin information.

6. The method of claim 1, wherein the operation of recommending the second action to be performed includes outputting the recommended second action to the designated worker by using the display and a speaker of the mobile computing device.

7. The method of claim 1, further comprising analyzing the initial digital twin information to determine that a component of the system being installed is nearing end of recommended usage and wherein the second action recommended includes replacing the component.

8. A non-transitory computer readable medium storing software comprising instructions executable by one or more computers, which, upon such execution, cause the one or more computers to:
  access initial digital twin information from a digital twin stored on a cloud server through an interactive assistant stored on the cloud server for system installation;
  analyze the initial digital twin information to detect a system failure;
  assign a designated worker by the interactive assistant for system installation based on the analysis of the initial digital twin information, wherein the designated worker is a robot and a mobile computing device is embedded in the robot;
  display an installation map on a display of a mobile computing device based on the initial digital twin information provided to the mobile computing device through the interactive assistant;
  perform system installation by repeatedly performing operations until determining that the system failure is repaired, the operations comprising:
    receiving images from an imaging device and text from the mobile computing device and storing the images as image data and the text as text data in the cloud server, wherein the images show one or more components of the system being installed and the text includes input from the designated worker;
    receiving updated digital twin information;
    determining whether the failure is repaired based on the image data, text data, and updated digital twin data;
    upon determining that the failure is not repaired, determining a first action to be performed by the designated worker based on analysis of the image data, text data, and the updated digital twin information, wherein the first action includes checking for an issue with a first component;
    upon receiving a communication from the designated worker that the issue does not exist with the first component, recommending that the designated worker check for the issue with a second component;
    upon receiving a communication from the designated worker that the issue exists with the second component, determining a second action to be performed by the designated worker based on analysis of the image data, text data, and the initial digital twin information; and
    recommend the second action to the designated worker via communication to the mobile computing device from the cloud server;
    display updated map on the display of the mobile computing device based on the updated twin information; and
  display installation is completed on the display of the mobile computing device after the system is installed based on analysis of the interactive assistant.

9. The non-transitory computer-readable medium storing software of claim 8, wherein determining the second action includes:
  converting the image data, text data, and updated digital twin data into a structured form, extracting features from the structured form, and applying weights to extracted features to create weighted features;
  applying an action predictor including deep neural network layers to the weighted features to generate the second action.

10. The non-transitory computer-readable medium storing software of claim 8, wherein the initial digital twin information comprises a virtual representation of the system installed in a building or a virtual representation of a component for the system.

11. The non-transitory computer-readable medium storing software of claim 8, wherein the issue is an oil leak.

12. The non-transitory computer-readable medium storing software of claim 8, further comprising recommending a tool for the designated worker to use based on analysis of the image data, text data, and the initial digital twin information.

13. The non-transitory computer-readable medium storing software of claim 8, wherein the operation of recommending the second action to be performed includes outputting the recommended second action to the designated worker by using a speaker of the mobile computing device.

14. The non-transitory computer-readable medium storing software of claim 8, wherein the text indicates information related to a status of the system being installed.

15. An interactive assistant for installing a system and for dynamically recommending one or more actions for installing the system, the interactive assistant comprising:
  one or more computers and a non-transitory computer readable medium storing instructions that are executable by the one or more computers to:
    access initial digital twin information from a digital twin stored on a cloud server through an interactive assistant stored on the cloud server for system installation;
    analyze the initial digital twin information to detect a system failure;
    assign a designated worker by the interactive assistant for system installation based on the analysis of the initial digital twin information, wherein the designated worker is a robot and a mobile computing device is embedded in the robot;
    display an installation map on a display of a mobile computing device based on initial digital twin information provided to the mobile computing device through the interactive assistant;
    perform system installation by repeatedly performing operations until determining that the system failure is repaired, the operations comprising:
      receiving images from an imaging device and text from the mobile computing device and storing the images as image data and the text as text data in the cloud server, wherein the images show one or more components of the system being installed and the text includes input from the designated worker;
      receiving updated digital twin information;
      determining whether the failure is repaired based on the image data, text data, and updated digital twin data;

upon determining that the failure is not repaired, determining a first action to be performed by the designated worker based on analysis of the image data, text data, and the updated digital twin information, wherein the first action includes checking for an issue with a first component;

upon receiving a communication from the designated worker that the issue does not exist with the first component, recommending that the designated worker check for the issue with a second component;

upon receiving a communication from the designated worker that the issue exists with the second component, determining a second action to be performed by the designated worker based on analysis of the image data, text data, and the initial digital twin information; and recommend the second action to the designated worker via communication to the mobile computing device from the cloud server;

display updated map on the display of the mobile computing device based on the updated twin information; and display installation is completed on the display of the mobile computing device after the system is installed based on analysis of the interactive assistant.

16. The interactive assistant of claim 15, wherein determining the second action includes:

converting the image data, text data, and updated digital twin data into a structured form, extracting features from the structured form, and applying weights to extracted features to create weighted features;

applying an action predictor including deep neural network layers to the weighted features to generate the first action.

17. The interactive assistant of claim 15, wherein the initial digital twin information comprises a virtual representation of the system installed in a building ora virtual representation of a component for the system.

\* \* \* \* \*